(12) United States Patent
Li

(10) Patent No.: US 11,093,086 B2
(45) Date of Patent: *Aug. 17, 2021

(54) METHOD AND APPARATUS FOR DATA ENTRY INPUT

(71) Applicant: AITECH, LLC, Buffalo Grove, IL (US)

(72) Inventor: Dong Ge Li, Hoffman Estates, IL (US)

(73) Assignee: AITECH, LLC, Buffalo Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,707

(22) Filed: Dec. 16, 2019

(65) Prior Publication Data
US 2020/0117310 A1 Apr. 16, 2020

Related U.S. Application Data

(63) Continuation of application No. 15/685,655, filed on Aug. 24, 2017, now Pat. No. 10,514,805, which is a
(Continued)

(51) Int. Cl.
*G06F 3/042* (2006.01)
*G06F 3/0488* (2013.01)

(52) U.S. Cl.
CPC ........ *G06F 3/0423* (2013.01); *G06F 3/04883* (2013.01); *G06F 3/04886* (2013.01)

(58) Field of Classification Search
CPC . G06F 3/0423; G06F 3/04883; G06F 3/04886
See application file for complete search history.

(56) References Cited

U.S. PATENT DOCUMENTS

| 4,988,981 A | 1/1991 | Zimmerman et al. |
| 5,025,705 A | 6/1991 | Raskin |

(Continued)

FOREIGN PATENT DOCUMENTS

| EP | 0489792 B1 | 3/1994 |
| WO | 9602394 A1 | 2/1996 |

(Continued)

OTHER PUBLICATIONS

Mackenzie, I. Scott, et al.; Text Entry for Mobile Computing: Models and Methods, Theory and Practice; published in Human-Computer Interaction, 2002, 17, pp. 147-198.
(Continued)

*Primary Examiner* — Mohamed A Kamara
(74) *Attorney, Agent, or Firm* — Greensfelder, Hemker & Gale, P.C.; Joseph A. Fuchs

(57) ABSTRACT

A method and apparatus for inputting data for an electronic data entry device are provided. In one embodiment, identification of an input object such as the particular fingers of a user that are used to actuate a key region is performed. The symbol associated with the actuated key region and the finger (or other input object) used is determined. In other embodiments, virtual input devices with interfaces such as QWERTY style keyboards, phone keypads, and multi-touch capable touchpads or tablets are provided in input regions. One or more video capturing devices remotely acquire actuation information from the input regions during data entry. User inputted symbols or functions are determined based on the actuations, their locations and identified input object sets that caused the actuations.

20 Claims, 18 Drawing Sheets

Related U.S. Application Data continuation of application No. 12/787,763, filed on May 26, 2010, now Pat. No. 9,760,214, which is a continuation-in-part of application No. 11/361,858, filed on Feb. 23, 2006, now Pat. No. 9,274,551.

(60) Provisional application No. 60/655,469, filed on Feb. 23, 2005, provisional application No. 61/216,993, filed on May 26, 2009, provisional application No. 61/217,649, filed on Jun. 3, 2009.

(56) References Cited

U.S. PATENT DOCUMENTS

| | | |
|---|---|---|
| 5,168,531 A | 12/1992 | Sigel |
| 5,245,559 A | 9/1993 | Lapeyre |
| 5,457,454 A | 10/1995 | Sugano |
| 5,581,484 A | 12/1996 | Prince |
| 5,767,842 A | 6/1998 | Korth |
| 5,790,103 A | 8/1998 | Willner |
| 5,793,312 A | 8/1998 | Tsubai |
| 5,825,352 A | 10/1998 | Bisset et al. |
| 5,841,374 A | 11/1998 | Abraham |
| 5,880,411 A | 3/1999 | Gillespie et al. |
| 5,973,621 A | 10/1999 | Levy |
| 5,982,302 A | 11/1999 | Ure |
| 6,011,554 A | 1/2000 | King et al. |
| 6,087,577 A | 7/2000 | Yahata et al. |
| 6,102,594 A | 8/2000 | Strøm |
| 6,204,848 B1 | 3/2001 | Nowlan et al. |
| 6,208,330 B1 | 3/2001 | Hasegawa et al. |
| 6,232,960 B1 | 5/2001 | Goldman |
| 6,307,549 B1 | 10/2001 | King et al. |
| 6,348,878 B1 | 2/2002 | Tsubai |
| 6,356,258 B1 | 3/2002 | Kato et al. |
| 6,407,679 B1 | 6/2002 | Evans et al. |
| 6,512,838 B1 | 1/2003 | Rafii et al. |
| 6,542,091 B1 | 4/2003 | Rasanen |
| 6,593,914 B1 | 7/2003 | Nuovo et al. |
| 6,611,252 B1 | 8/2003 | DuFaux |
| 6,611,253 B1 | 8/2003 | Cohen |
| 6,614,422 B1 | 9/2003 | Rafii et al. |
| 6,654,484 B2 | 11/2003 | Topping |
| 6,670,894 B2 | 12/2003 | Mehring |
| 6,690,618 B2 | 2/2004 | Tomasi et al. |
| 6,710,770 B2 | 3/2004 | Tomasi et al. |
| 6,885,317 B1 | 4/2005 | Gutowitz |
| 7,016,711 B2 | 3/2006 | Kurakane |
| 7,020,270 B1 | 3/2006 | Ghassabian |
| 7,088,340 B2 * | 8/2006 | Kato .............. G06F 3/0236 345/168 |
| 7,151,530 B2 | 12/2006 | Roeber et al. |
| 7,199,786 B2 | 4/2007 | Suraqui |
| 7,439,957 B2 | 10/2008 | Chu et al. |
| 7,530,031 B2 | 5/2009 | Iwamura et al. |
| 7,555,732 B2 | 6/2009 | Van der Hoeven |
| 7,725,511 B2 | 5/2010 | Kadi |
| RE43,082 E | 1/2012 | Gutowitz |
| 9,760,214 B2 * | 9/2017 | Li .............. G06F 3/04886 |
| 10,514,805 B2 * | 12/2019 | Li .............. G06F 3/04886 |
| 2002/0021287 A1 | 2/2002 | Tomasi et al. |
| 2002/0075240 A1 * | 6/2002 | Lieberman ........... G06F 3/0426 345/170 |
| 2002/0140582 A1 | 10/2002 | Ye |
| 2002/0163506 A1 | 11/2002 | Matusis |
| 2002/0171633 A1 | 11/2002 | Brinjes |
| 2002/0180698 A1 | 12/2002 | Kaelbing |
| 2003/0043118 A1 | 3/2003 | Lee |
| 2003/0048260 A1 | 3/2003 | Matusis |
| 2003/0063775 A1 | 4/2003 | Rafii et al. |
| 2003/0179185 A1 | 9/2003 | Iwamura et al. |
| 2004/0032398 A1 | 2/2004 | Ariel et al. |
| 2004/0046744 A1 | 3/2004 | Rafii et al. |
| 2004/0169635 A1 | 9/2004 | Ghassabian |
| 2004/0179001 A1 | 9/2004 | Morrison et al. |
| 2004/0196268 A1 | 10/2004 | Hsu et al. |
| 2004/0242988 A1 | 12/2004 | Niwa et al. |
| 2004/0263473 A1 | 12/2004 | Cho et al. |
| 2005/0024338 A1 | 2/2005 | Ye |
| 2005/0162402 A1 | 7/2005 | Watanachote |
| 2005/0225538 A1 | 10/2005 | Verhaegh |
| 2005/0253814 A1 | 11/2005 | Ghassabian |
| 2006/0028358 A1 | 2/2006 | Bollman |
| 2006/0028450 A1 | 2/2006 | Suraqui |
| 2006/0114233 A1 | 6/2006 | Radivojevic et al. |
| 2006/0132447 A1 | 6/2006 | Conrad |
| 2006/0190836 A1 | 8/2006 | Ling Su et al. |
| 2006/0282791 A1 | 12/2006 | Bogomolov et al. |
| 2007/0035521 A1 | 2/2007 | Jui et al. |
| 2008/0300010 A1 | 12/2008 | Border et al. |
| 2009/0183098 A1 | 7/2009 | Casparian et al. |
| 2009/0237361 A1 | 9/2009 | Mosby et al. |
| 2010/0231522 A1 | 9/2010 | Li |

FOREIGN PATENT DOCUMENTS

| | | |
|---|---|---|
| WO | 0159558 A1 | 8/2001 |
| WO | 0159975 A2 | 8/2001 |
| WO | 0210896 A2 | 2/2002 |
| WO | 03046706 A1 | 6/2003 |
| WO | 03050795 A1 | 6/2003 |
| WO | 2009059479 A | 5/2009 |

OTHER PUBLICATIONS

Roos, Gina; Fingerprint Sensor Touts Security, Navigation, and Personalization for Cell Phones, eeProductCenter, Mar. 10, 2005, 4 pages.

* cited by examiner

METHOD AND APPARATUS FOR DATA ENTRY INPUT

RELATED US APPLICATION DATA

This application is a continuation of U.S. patent application Ser. No. 15/685,655 filed Aug. 24, 2017, which is a continuation of U.S. Pat. No. 9,760,214 issued Sep. 12, 2017, which is a continuation-in-part of U.S. Pat. No. 9,274,551 issued Mar. 1, 2016, entitled "METHOD AND APPARATUS FOR DATA ENTRY INPUT," and claims the benefit of U.S. provisional applications Ser. No. 60/655,469 filed Feb. 23, 2005, Ser. No. 61/216,993 filed May 26, 2009 and Ser. No. 61/217,649 filed Jun. 3, 2009, which are fully incorporated herein by reference.

The invention described herein was made, in part, in the course of work supported by National Science Foundation Grant IIP-0924574.

FIELD OF THE INVENTION

The present invention relates in general to the field of data entry, and in particular, to methods and apparatus for user input in a device.

BACKGROUND OF THE INVENTION

Today, computers of various kinds have reached nearly every corner of people's lives. Computer-based technology is found in cars, televisions, telephones and even watches. With computers becoming increasingly portable, powerful, and affordable, the technology has made mobile computing a more common occurrence. As a result, more microprocessor-based computing units incorporated in various compact data entry devices have been developed.

In office environments, input to electronic data entry devices, such as personal computers, through a known QWERTY keyboard is a common occurrence. However, QWERTY keyboards are not well suited for many non-office environments or mobile use cases, since they are too large in size and require additional support to free both hands for operation.

Several alternative input methods for mobile applications have been proposed. For instance, the use of mini-keyboards have been proposed, some of which can even be folded to reduce physical size and, thus, increase portability. These mini-keyboards, however, can be inefficient and are difficult to use in many typing scenarios as the keys are often quite tiny and are tightly packed together.

The use of different keyboard layouts to reduce keyboard size has also been considered. One keyboard having as few as twelve keys has been suggested with the keys representing up to 144 characters/functions using combinations of multiple keystrokes. Alternative attempts include different layouts to fit the most frequently used keys into portable devices such as wireless mobile telephones. However, such unconventional keyboards are often difficult to learn and use. Since most people first learn to type on the QWERTY or telephone-style keyboards, their instincts tend to favor their initial training, making it difficult for them to re-learn something which deviates drastically from such initial training.

Voice recognition and handwriting recognition approaches have attempted to provide alternatives to conventional data entry in certain applications. Handwriting input approaches are often substantially slower than conventional typing, while voice input approaches still face many challenges due to background noise and other factors. In addition, the use of voice recognition systems in many situations can be disturbing to the public and also often lacks privacy.

One type of input device known as a "virtual keyboard" operates by projecting a laser image of a full-size QWERTY keyboard layout on a flat surface and also allows users to type on it. Such devices require a separate support surface and also take up considerable space during operation as a traditional full-size keyboard is displayed requiring both hands of a user to efficiently type data into the device. Furthermore, the laser projector requires relatively high power consumption. Thus, such virtual keyboards are not always well suited for the mobile environment.

BRIEF DESCRIPTION OF THE DRAWINGS

The accompanying figures wherein like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Generally, stated, an apparatus and methods for determining a user inputted symbol or function is provided. A computer-implemented data entry device having an associated memory adapted to store information associating symbols or functions with corresponding key regions of the data entry device is provided. The symbols or functions associated with individual key regions, are assigned, in memory, to corresponding input objects. The key regions of the data entry device may be of various types such as keys of a keyboard, touch-sensitive regions, virtual key regions having pre-assigned regions in two-dimensional space, or virtual key regions having the assigned regions in three-dimensional space. An input object may be any object that is capable of being used to tap or actuate a key region, for example: one or more fingers of a hand of a user, a portion of a finger, an actuating device (such as a stylus or tablet pen), or part of an actuating device. The computer-implemented data entry device has a processor (such as a microprocessor) adapted to: determine which key region has been actuated, identify the input object associated with the actuation of the key region, and output an associated symbol or perform an associated function in response to the identification of the input object that actuated the key region.

In one example, the input object identified may be a finger (or fingers) of a hand of a user. The apparatus associated with the data entry device may utilize one or more sensors to detect finger features such as: size, shape in two or three-dimensional space, edge, vein pattern, nail color, skin texture, skin tone, area of contact with actuated key region, pressure or impact of contact with actuated key region, sound of contact with actuated key region, impedance, conductance, capacitance, inductance, infrared properties, ultrasound properties, thermal properties, fingerprint, or a derivative of one or more of the finger features. Alternatively, one or more non-finger input objects (such as a stylus or tablet pen or other actuating devices or objects that differ from the fingers of a user) may be identified as actuating a key region. A single sensor or multiple sensors may be used to detect various object features such as: size, shape in two- or three-dimensional space, edge, color, surface texture, area of contact with actuated key region, pressure or impact of contact with actuated key region, sound of contact with actuated key region impedance, conductance, capacitance, inductance, infrared properties, ultrasound properties, thermal properties, and a derivative of one or more of the object features.

Figure 3:
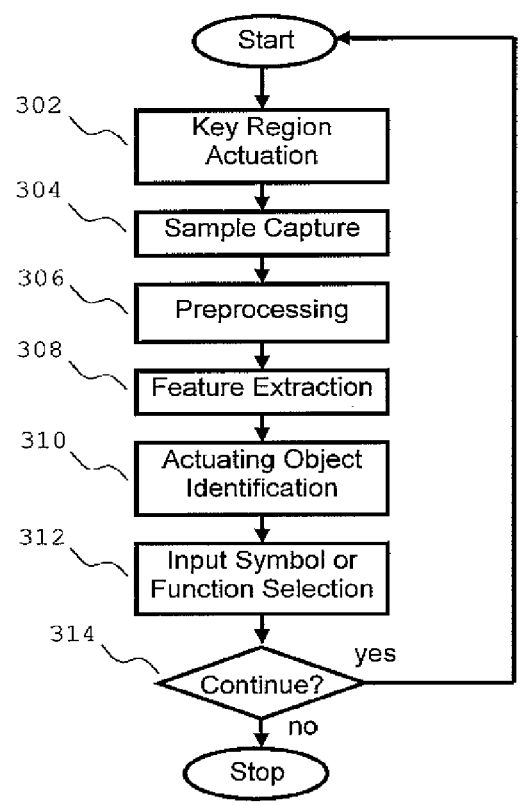
FIG. 3 is a flowchart illustrating a process for actuating finger or object identification.

In one particular embodiment, disclosed herein with reference to FIG. 3, the data entry device utilizes at least one sensor to perform a sample capture in which the sample contains a feature for the identification of the input object. The computer-implemented data entry device is adapted to perform a pre-processing operation on the captured sample and extract at least one feature of the input object from the captured sample. The computer-implemented data entry device identifies the input object actuating the key region via identification of the extracted feature and selects the symbol or function corresponding to the input object identified as actuating the key region.

In another example, the data entry device memory is adapted to store information assigning the symbols or functions associated with the individual key regions to corresponding identifiable differentiating objects that are placeable on an input object. Identifiable differentiating objects are objects which possess at least one feature, such as color, surface texture, shape, and the like, that could be detected and used to identify the objects. If the input object includes one or more fingers of a user, examples of identifiable differentiating objects may include: sensors, gloves, rings, switches, tags, or a derivation thereof. The computer-implemented data entry device is adapted to identify the input object that actuated the key region via identification of an identifiable differentiating object placed on the input object. The corresponding symbol is outputted or the corresponding function is performed in response to the identification of the input object used to actuate the key region.

As is provided herein, sensors coupled with the processor of the data entry device may be utilized to identify the input object actuating a key region. Various sensors may selectively be employed such as: contact sensors, contactless sensors, active sensors, or hybrid sensors of two or more of these sensors. For example, an active sensor may be used to detect the input object by projecting reference signals (such as electromagnetic wave signals or ultrasound signals) onto the input object and detecting feedback from the projected reference signals.

The memory of the computer-implemented data entry device may also be adapted to store information assigning the symbols or functions (associated with the key regions) to corresponding identifiable differentiating parts of the input objects. Identifiable differentiating object parts are portions of input objects which possess at least one feature, such as color, surface texture, shape, and the like, that could be detected and used to identify that portion of the input objects. The data entry device identifies the part of an input object that was used in actuating the key region and outputs a symbol or performs a function in response to the identification of the input object part. Alternatively, information is stored in memory assigning the key region symbols or functions to corresponding user-configured alterable features exhibited by the input objects. User-configured alterable features exhibited by input object arc variable features of an object that may change based on some user configuration. For example, a small screen on a stylus may show different colors depending on which button on the stylus a user presses. The computer-implemented data entry device identifies a feature exhibited by the input object while being used in actuating a key region and also outputs the symbol or performs the function in response to the identification of the feature exhibited by the input object.

Figure 1:
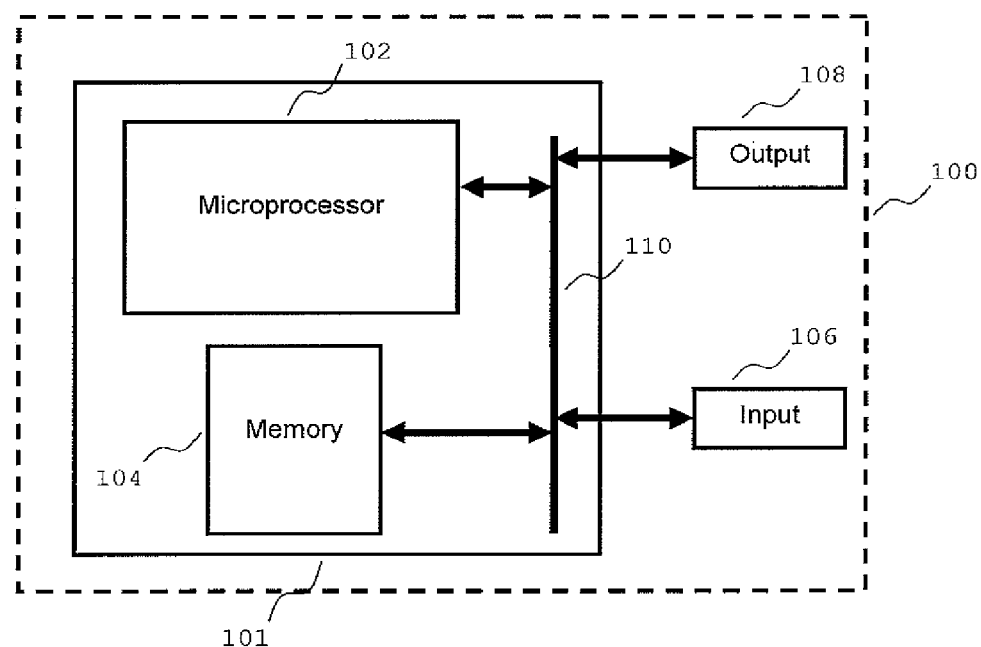
FIG. 1 is a functional block diagram illustrating components relating to one example of a data entry device.

FIG. 1 is a functional block diagram illustrating components relating to portions of one embodiment of a computer-implemented data entry device 100. As part of the data entry device 100, a computer-implemented system 101 is provided having a processor component coupled with an associated computer memory component. In particular, the electronic data entry device 100, in this example, has a processor, such as microprocessor unit 102, coupled to a memory unit 104, as part of the computer-implemented system 101, as well as an input module 106, and an optional output module 108 coupled directly or indirectly together through at least one data bus 110. The microprocessor unit 102 executes program instructions, stored in memory unit 104, including instructions relating to the underlying controlling software of the device 100, in response to user input received through the input module 106. Such user input may include, for example, the tapping or actuation of key regions that arc of mechanical construction on an electronic keyboard, the tapping or actuation of software configured simulated keys on a touch screen or touch pad, and the actuation of a virtual input region, as part of input module 106 to access a symbol or function. An input region is a predetermined area in two-dimensional or three-dimensional space. The location of the input region is typically fixed in relation to some reference point or object, such as a working surface, a face, a hand, a computing device, and so on.

The microprocessor unit 102 may process the user input and send the processed results to the output module 108, to present the processed results to the user. The processed results, for example, may be presented to the user in the form of text, graphics, audio, video, or in some other forms of feedback or action, such as the device 100 engaging in communication with another device. Although the input module 106 and the optional output module 108 are shown in the embodiment of FIG. 1 as components included as part of the electronic data entry device 100, they may alternatively be provided as separate entities to the device 100 apart from a single physical unit. It should be observed that the apparatus components described herein have been represented where appropriate by conventional symbols in the drawings, showing only pertinent specific details so as not to obscure the disclosure with details that will be readily apparent to those of ordinary skill in the art having the benefit of the description herein. It is understood that the data entry device may be provided in many different examples such as personal computers, personal digital assistants (PDAs), telephones, wireless telephones, remote controls, electronic musical instruments, control consoles of industrial or medical devices, and the like, or any other device whereby user input is received by the device for processing.

Actuating object identification technology is utilized in the data entry device embodiments provided herein to determine which object, such as a finger from a hand of a user, is used to actuate a key region (e.g., a key), in order to select appropriate user inputted symbols or functions. A key region is a region to which one or more symbols or functions have been assigned such that when a finger or some other object with identifiable feature(s) is detected as actuating or making contact with the region, an assigned symbol or function of the region will be selected as user input in the data entry device. Some examples of key regions include, but are not limited to: discrete mechanical keys, software configured simulated keys on touch screens or touch pads, and virtual key regions comprising some location in two-dimensional or three-dimensional space. It is understood that the surface of an actual discrete key may be considered a key region or a portion thereof.

The application of object or finger identification technology to identify tapping or actuating objects or fingers of a user allows for the determination of input symbols or functions in data entry devices and systems. Such technology used to recognize tapping fingers/objects in a keystroke may be referred to as Tapping Finger Identification (TFI) technology. Identifying a particular tapping object or finger of a user in combination with the determination of an actuated key region (such as a key actuation) can allow for the reduction in the number of keys or key regions needed on a data entry device. In systems implementing actuating object or finger identification technology, symbol selection within a multi-symbol main key or key region is determined by a corresponding actuating object or finger identified in a keystroke. This allows several different key regions such as discrete keys, each capable of inputting one or more symbols or functions, to be merged into one, thus reducing the number of keys needed to provide full keyboard functionality. As the number of keys is reduced, the size of the keys may, for example, be increased, which allows a user to efficiently input data information into a computer-based device or system. This provides a user-friendly, compact data entry device that is suitable for handheld and mobile applications. Furthermore, the number of keystrokes required to enter a symbol or function in the data entry device may also be reduced since the input object (e.g., actuating device or finger), in most cases, directly selects the corresponding symbol or function in a multi-symbol key or key region in a single keystroke.

Techniques used in the identification of actuating fingers generally involve the extraction and matching of various differentiating finger features such as finger skin texture. Since similar techniques can be used, in general, to extract and match differentiating features of non-finger objects, such as object surface texture, the following descriptions herein with references to actuating object identification will focus on tapping fingers, although it is understood that they can be easily extended to non-finger tapping objects.

Several techniques can be used to identify tapping fingers or objects performing actuation on a key region of a data entry device. These technologies employ contact sensors, contactless sensors, or some combination thereof to identify a tapping or actuating finger in a keystroke. During the input processing at the data entry device, an actuating finger must make physical contact with a contact sensor in order for the sensor to detect relevant features(s) associated with the finger. A contactless sensor, however, is capable of detecting relevant finger feature(s) from a remote location. Cameras and fingerprint sensors are two examples of sensors commonly used in finger or object identification. Fingerprint sensors are sensors capable of capturing biometric fingerprint features. Many types of fingerprint sensors, for example, are contact sensors. Cameras are optical sensors that capture still or motion pictures using visible or infrared light. Optical sensors generally operate as contactless sensors.

Soft boundaries are further selectively provided for determining symbol selection in shared finger-keystroke combinations. Soft boundary locations are software-defined boundaries (i.e., not physical key boundaries) between two adjacent symbols or symbol pairs that are selectively interpreted only when certain fingers are identified as the actuating finger in a keystroke. The key regions are divided by the adjustable boundary locations defined by user-configurable program instructions stored in the memory 104 (FIG. 1) associated with the data entry device. Thus, adjustable boundary locations are established by detecting where a key region is struck. Similar adjustable boundary location concepts may be found in existing software-configured simulated keys on touch screens or touch pads commonly employed in PDAs, except that the actuating fingers or objects are not considered in the interpretation of the boundary location or existence. Whenever a key region is actuated, contact sensors or contactless sensors, can be used to detect on which side of the soft boundary the centroid of touch area falls to determine which of two adjacent symbols or symbol pairs was selected as input.

Figure 2A:
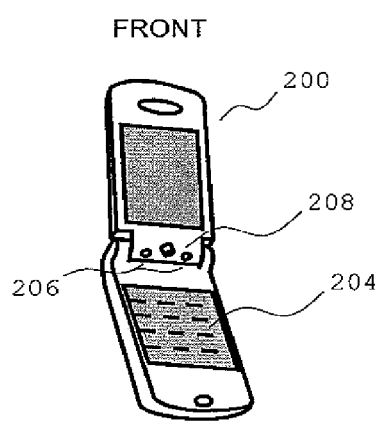
FIG. 2A shows a front perspective view of one embodiment of an example data entry device with actuating finger identification capabilities and soft boundary capabilities.
Figure 2B:
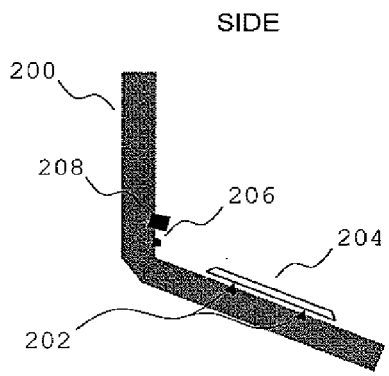
FIG. 2B shows a side view of the embodiment of the data entry device example of FIG. 2A.

Referring to FIGS. 2A and 2B, one example embodiment of a data entry device 200 is shown, in which keystrokes are used to trigger sensors associated with the input module of the device 200 for the identification of tapping or actuating fingers of a user. FIG. 2A provides a front perspective view and FIG. 2B provides a side view of device 200, the input module of which is configured with contactless sensor 208, light emitting diodes (LEDs) 206, main keypad 204, and multiple triggers 202 positioned under the main keypad 204. With soft boundaries configured horizontally to define five rows of keys as illustrated by hashed lines in FIG. 2A, a single large main keypad 204 employing contact sensors is used to provide main key functions, with the layout of main keys on the keypad 204 being programmable. Soft boundaries may be set at different locations, which may include vertical boundaries in addition to horizontal ones, providing for different key region layouts. The main keypad 204 is used, in this example, to detect finger tapping locations, thereby determining which of the five main keys was struck in a keystroke based on where the centroid of touch area is detected relative to the soft boundaries. Although the keypad 204 depicted in the example embodiment of FIGS. 2A and 2B is one of the touch sensor type, it is understood that the keypad 204 may, instead, comprise of discrete mechanical keys.

FIG. 3 is a flowchart illustrating the process utilized by a data entry device (such as device 200, FIGS. 2A and 2B) to determine which symbol or function on a multi-symbol main key or key region is being input in response to user actuation of the device. This process includes the following steps: 1) key region actuation 302, 2) sample capture 304, 3) preprocessing 306, 4) feature extraction 308, 5) actuating object identification 310, and 6) input symbol or function selection 312. As will be understood by skilled artisans the receipt and processing of such information is preferably performed by the microprocessor 102 operating in conjunction with an associated memory 104 of the computer-software based data entry device 100, FIG. 1. For example, during operation of the data entry device 200, FIG. 2, the detection of keystrokes on the main keypad 204 as determined by the triggers 202 positioned under the main keypad 204 is performed in step 302. The detection of a keystroke will trigger a sample capture performed by sensor 208 in step 304. The sample captured, in this example, is a still image containing details pertaining to the actuating object, such as a tapping finger of a user. Besides still images, the sample captured in other instances may comprise of audible signals such as the sounds of impact generated by actuating objects when they make contact with a key region, motion videos, three-dimensional ultrasound maps, and the like. The captured image, in this case, undergoes one or more preprocessing operations in step 306, such as color balance, brightness adjustment, sharpening enhancement, and the like. In step 308, key features on the actuating object are extracted. The order of steps 306 and 308 may selectively be altered. For instance, step 308 may be carried out prior to step 306, since the amount of data to be operated upon during the preprocessing in step 306 is significantly less when it is performed only on the extracted features. An identification of the actuating object is made in step 310 based on the features extracted in step 308. In step 312, one of the multiple symbols or functions associated with the actuated key region corresponding to the actuating object identified is selected for input. In step 314, the processing determines if additional symbol inputs or function are needed to be identified. Steps 302-312 are then repeated to determine additional symbol inputs or functions if the finger identification processing continues in step 314. Otherwise, the operation may be terminated.

Figure 4:
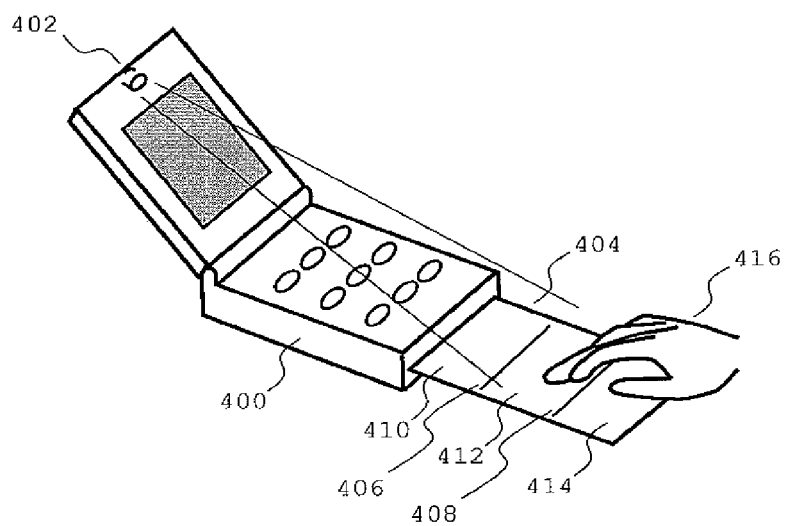
FIG. 4 shows an example of a data entry device having actuating finger identification capabilities and providing a virtual input method.

FIG. 4 illustrates an example embodiment of a data entry device 400 having sensor 402 and virtual input capabilities. The data entry device 400 determines which virtual key region has been actuated. A contactless sensor (such as sensor 402) is employed to identify a pre-assigned region in which the input object (such as a tapping finger) is situated. The typing surface, or virtual keyboard, in this device is a retractable panel 404 in the device 400 that has been extended. As shown in FIG. 4, a series of markings 406, 408 (e.g., in the form of horizontal lines) are present on the virtual keyboard 404 to distinguish between several rows of virtual key regions 410, 412, and 414. The sensor 402 suited for implementation in this particular data entry device is one of the optical types (e.g., camera) that is capable of continuous, real-time video capture and analysis. The sensor 402 monitors finger motion to detect keystroke events, which are characterized by an extension of a tapping finger followed by its retraction, resulting in a brief pause when the tapping finger makes contact with the virtual keypad. The sensor 402 then extracts a graphical image of the keystroke event from the real-time video it captures, and determines the tapping location to identify the key region actuated. The sensor 402 further detects the tapping finger in the extracted graphical image. An input symbol on the actuated key region is then selected based on the finger-location combination detected. The example depicted in FIG. 4 shows the right middle finger of a hand 416 of a user tapping the middle key region 412 on the virtual keyboard 404. As needed, additional markings may be added to the panel to provide additional virtual key regions.

As previously stated, the markings are primarily provided as guides to assist users in establishing a reference location in a virtual keyboard and visualizing the virtual key regions. Elimination of the markings and a tangible typing surface such as the panel 404, FIG. 4, enables users to freely type in any location, such as in midair. The movements of the fingers of a typing hand suspended in midair can be processed by an optical sensor capable of continuous, real-time video capture and analysis, similar to the process described with reference to the optical sensor 402 in FIG. 4.

Figure 5:
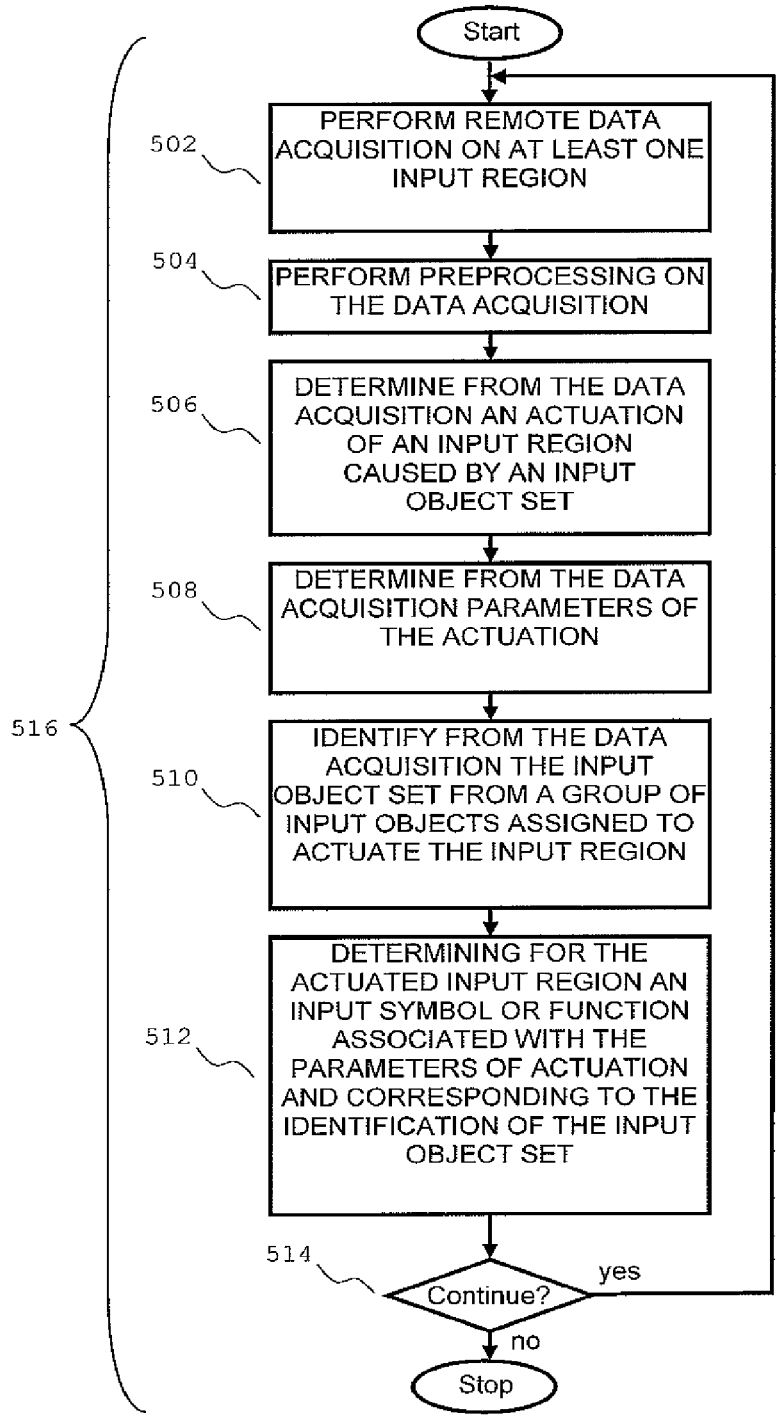
FIG. 5 is a flowchart illustrating a process for determining virtual input in accordance with some embodiments of the present invention.

In some embodiments of the present invention, the input module 106, FIG. 1, may be configured to receive input from a virtual device. In such embodiments, module 106 may utilize one or more contactless sensors to remotely acquire actuation information from an input region and identify an actuating input object set (one input object or a combination of input objects) from a group of input objects (e.g., two or more input objects). FIG. 5 is a flowchart illustrating a process 516 for determining virtual input in accordance with such embodiments of the present invention.

The process 516 includes the following steps: 1) performing remote data acquisition on at least one input region, wherein each input region provides a virtual device; 2) performing preprocessing on the data acquisition; 3) determining from the data acquisition an actuation of an input region caused by an input object set; 4) determining from the data acquisition parameters of the actuation; 5) identifying from the data acquisition an input object set from a group of input objects assigned to actuate the input region; and 6) determining for the actuated input region an input symbol or function associated with the parameters of actuation and corresponding to the identification of the input object set.

For example, during operation of the data entry device 100, FIG. 1, the input module 106 utilizes one or more video capturing devices as contactless sensors to remotely acquire data on an input region designated to receive user input, according to step 502, FIG. 5. The acquired data may include, for instance, motion and location information of input object(s) such as finger(s) of a user's hand(s) captured in a series of image frames. The acquired image frames may undergo one or more preprocessing operations, such as color balance, brightness adjustment, sharpening enhancement, and the like, in step 504 of the process 516, FIG. 5. Such operations are preferably performed by the microprocessor unit 102, FIG. 1. In step 506, the process continues by determining if an actuation on the input region caused by an input object set has occurred. An actuation is defined herein as a pre-assigned user action on or within the input region that is interpreted by the system as valid input. Some examples of actuation include, but not limited to: tapping finger(s) on an input region to signify a keystroke or mouse click, sliding finger(s) in an input region to signify mouse cursor movement, and making particular finger gestures (e.g., extending index and middle fingers to form a «y" sign) within an input region to signify particular commands. If an actuation event occurred, process 516 further determines from the image frames parameters of the actuation in step 508, using methods to be described subsequently. Some actuation parameters, such as the location of an actuation within an input region, may have multiple input symbols or functions associated therewith, wherein each symbol or function is assigned to a corresponding input object set from a group of input objects. Other examples of actuation parameters include, but not limited to: speed of actuation, input object set posture during actuation, and relative positions and speeds of the objects in an input object set during actuation. The input object set that caused the actuation is then identified from the group of input objects assigned to actuate the input region in step 510, utilizing information obtained in step 508. For example, a tapping middle finger is identified from the group of fingers on a user's left hand assigned to actuate keys on a left portion of a virtual keyboard. Step 512 selects an input symbol or function associated with the parameters (e.g., location) of actuation and corresponding to the actuating object set that caused the actuation. For example, the symbol "D" is determined as the input based on an identification of a left middle finger tapping in the middle row of a virtual QWERTY keyboard. In step 514, the process 516 determines if further input is to be processed. Steps 502-512 are then repeated to determine additional symbol or functions if the input process continues in step 514. Otherwise, the operation may be terminated. Although fingers have been used as input objects in the examples above, it is understood that many other objects, such as stylus, tablet pens, etc. can also be input objects.

There are numerous suitable virtual input devices that may be provided in an input region for user input. One example is a virtual keyboard with QWERTY style layout of keys while another is a virtual mouse with a touchpad interface. The virtual input devices herein functions as an interface for user input but requires no tactile sensing mechanisms such as mechanical keys or a touch-sensitive surface. These virtual devices are often invisible, although an image of the device may be present on the input region as an assisting feature. For example, an image may be projected onto the input region by the input module 106 (FIG. 1) using a laser or light emitting diode (LED). Alternatively, a paper bearing a printed image may be placed on the input region.

Figure 6:
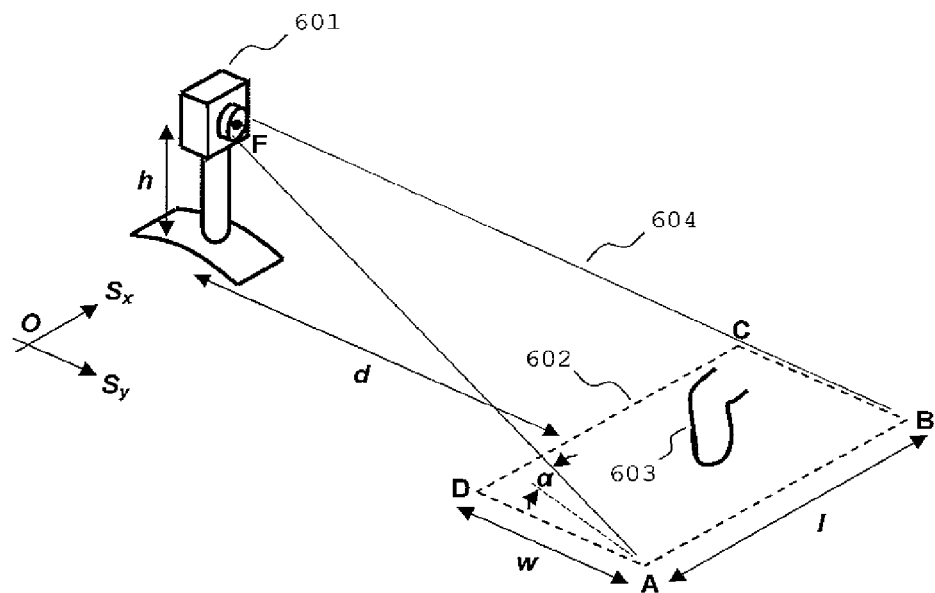
FIG. 6 illustrates one exemplary embodiment of the present invention for receiving virtual input using a single video capturing device.

In one embodiment of the present invention, shown in FIG. 6, the input module provides a single video capturing device 601 to perform remote data acquisition on an input region 602 providing a virtual device. The video capturing device 601 may be a conventional video camera that is passive, operating in the visible light spectrum. Video cameras that operate outside of this spectrum, such as in the infrared (IR) spectrum, may also be used. Using infrared cameras may provide better results since the acquired data is not subject to variations in ambient lighting conditions. The video capturing device 601 is disposed a small distance h from the plane containing the input region 602. The input region 602 that is within the view of the video capturing device 601 is shown as having four corners denoted A, B, C, and D and having length l and width w. This input region is disposed a distance d from the base of the video capturing device 601. A focal point F of the video capturing device 601 and points A and B lie on a plane 604. Note that plane 604 is conceptual in nature and extends infinitely in all directions, although it is illustrated in FIG. 6 as finite. Plane 604 is disposed proximate the plane containing input region 602. In a preferred form of the invention, the distance d is large compared to the distance h, e.g., d=5 h. In such instances, the two planes are nearly parallel. The largest vertical distance from plane 604 to the input region 602 may be only a few millimeters.

Figure 7:
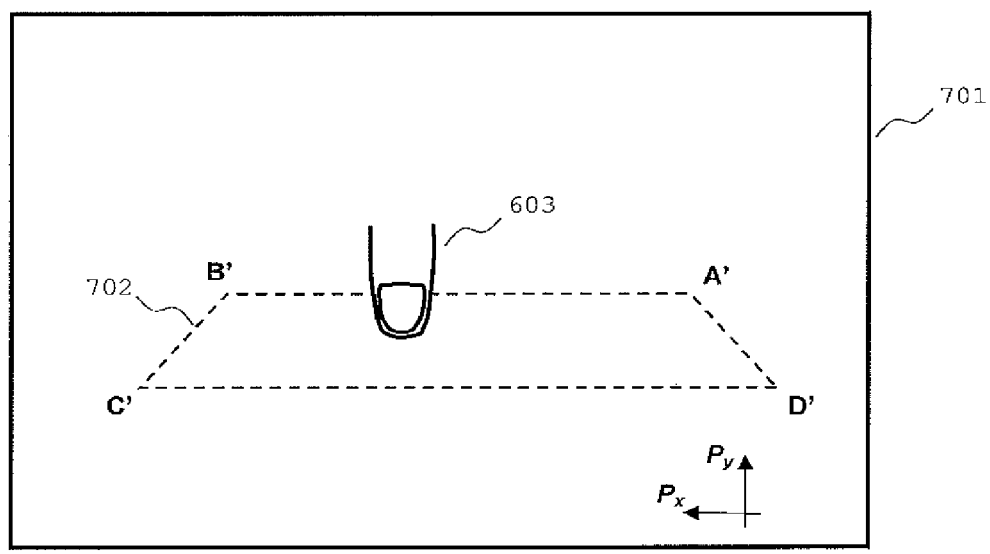
FIG. 7 illustrates an example image acquired by the video capturing device in the embodiment of FIG. 6.

Depicted in FIG. 7 is an image 701 that may be captured by video capturing device 601. The corner points A, B, C, and D of the input region 602 is mapped correspondingly to the points A', B', C', and D', in the image capture 701. Also depicted in FIG. 7 is the finger 603 of FIG. 6.

The input region 602, FIG. 6, may be disposed at a location that is fixed (i.e., predetermined) or dynamic relative to the video capturing device 601 (i.e., determined at the start of usage). Typically, the input region is an area on a work surface suitable for virtual input. The work surface may be, for example, a table top, a retractable panel on a mobile device, or even a person's lap. If the input region 602 is at a fixed location relative to the video capturing device 601, then the boundary A'B'C'D' of the area 702 in FIG. 7 will also be fixed. This allows the input region 602 to be designated and stored during device manufacture, so that the system may be able to inherently determine the input area during usage. It is worth noting that the shape of the input region, such as 602 in FIG. 6, in some embodiments may undergo a transformation when mapped to the captured image, such as 701 in FIG. 7. Thus, the input region 602 with perimeter ABCD in FIG. 6 may be visualized as a trapezoid 702 with perimeter A'B'C'D' in the captured image 701. Depending on the optical properties of the video capturing device 601, straight lines on the input surface may not be visualized as straight in the captured images. Although the input region 602 illustrated in FIG. 6 is a rectangle, many other shapes, such as a circle, ellipse, polygon, triangle, etc. may be used and the principles described herein also apply. Additionally, the surface of the input region 602 need not be flat as long as the capturing device 601 has a complete view of the entire region.

If the location of the input region 602 relative to the video capturing device 601 is not predetermined, then the perimeter A'B'C'D' of the region 702 as it is visualized in the captured image 701 will not be fixed in location. Thus, the location of the input region must be determined every time prior to or during usage. This may be achieved via an initialization process, such as using a particular gesture or object(s) to designate on the input region some reference position (e.g., the "center") of a virtual input device. For example, a user may place all ten fingers together in a "home row" gesture and tapping within the input region to indicate as a reference position for the middle row of keys (having keys "A", "S", "D", and so on) of a virtual QWERTY keyboard. Assuming a pre-determined size and shape for the input region, its. perimeters may then be dynamically determined based on the user-designated reference position. In this case, the relevant parameters, such as the video capturing device height h, a calibration matrix, the size and shape of the input region, etc. for determining the input region as it is visualized on the captured image may be derived and stored during device manufacture or initialization prior to first use. Once a reference position of the input region (e.g., a corner or center) is known, its perimeter may be obtained on-the-fly using the pre-stored parameters.

Establishing the location and perimeter of the input region enables step 502 of the process 516, FIG. 5 to be carried out by the system. In step 504, preprocessing operations such as color balance, brightness adjustment, sharpening enhancement, and the like are performed on the remotely captured image frames to simplify the remaining processing steps. The system subsequently determines from the image frames whether an actuation of the input region has occurred in step 506.

Determining an actuation of the input region by an input object can be achieved in several ways. For example, a tapping event may be detected via the following processing steps utilizing thresholds: 1) motion detection; 2) optional object detection, e.g., finger detection; 3) threshold checking. In the first step of motion detection, the system utilizes frame differencing techniques to extract image capture areas in which motion has occurred. An additional step of object detection may be optionally performed on the motion areas to eliminate false positives from the motion detection in step 1. For example, assuming that fingers are the input objects operating a virtual input device, all non-finger objects detected in the motion areas can be eliminated. The last step of threshold checking identifies a tapping event when an object quickly moves downward, briefly stopping within the input region and retracts. Several thresholds may be used to define minimum travel speed, deceleration rate, travel distance, and the range of the valid input surface.

Figure 9:
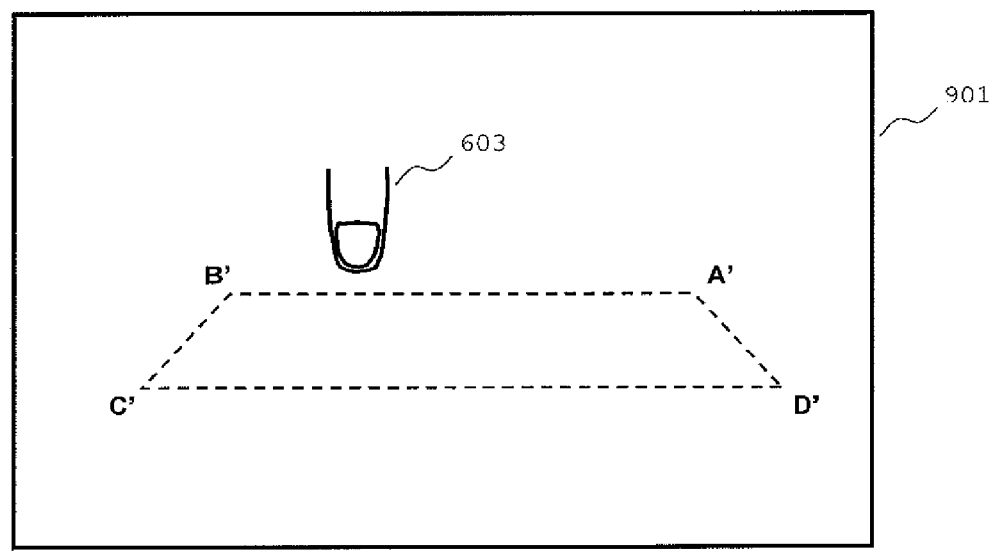
FIG. 9 illustrates another example image acquired by the video capturing device in the embodiment of FIG. 6.
Figure 10:
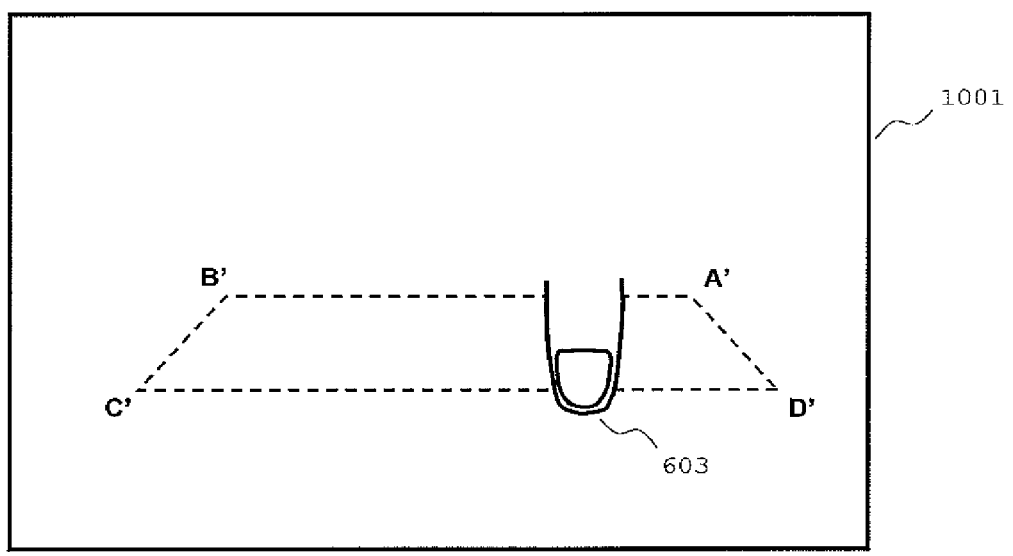
FIG. 10 illustrates yet another example image acquired by the video capturing device in the embodiment of FIG. 6.

Plane 604 in FIG. 6 provide a means to enable simple threshold checking. Since plane 604 is in close proximity to the plane containing input region 602, a tapping event may thus be efficiently detected when an input object, such as finger 603, briefly makes contact with or penetrates plane 604 while stopping within the perimeter of input region 602, as shown in the image captures. 801-803 of FIG. 8. Image capture 801 is performed at a time t, while image captures 802 and 803 are performed at a time t 30 Δt and t+Δt, respectively, where Δt represents a small time interval. Since plane 604 is visualized as a line containing the points A' and B' in the image captures 801-803, any object, such as finger 603, that makes contact with or penetrates plane 604 would appear as if it touches or crosses line A'B'. This is the case depicted in image capture 802 of FIG. 8. Thus, plane 604 in FIG. 6, or line A'B' in FIGS. 7-8, may be considered as a "threshold" that must be crossed in an actuation of the input region. FIGS. 9-10 illustrate two examples of the input finger 603, FIG. 6, tapping the work surface but outside of the input region 602. That is, the tip of the finger 603 (i.e., the lowest vertical point on the outline of the input object) does not fall within the perimeter A'B'C'D' of the image of input region 602.

Figure 8:
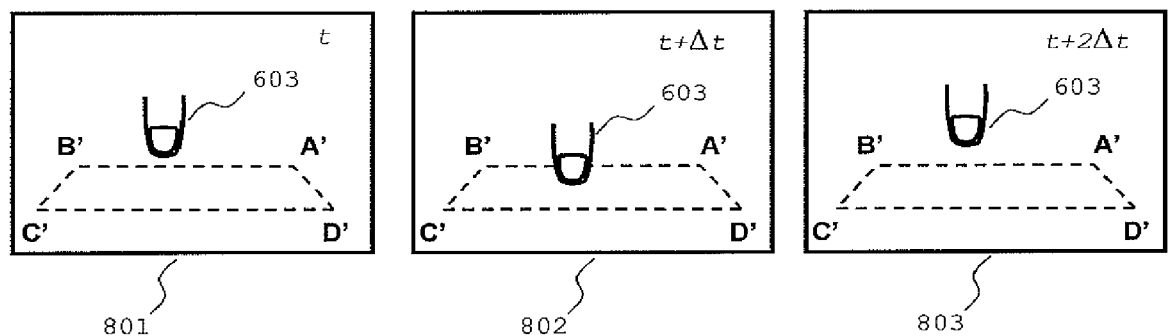
FIG. 8 illustrates a series of example images acquired by the video capturing device in the embodiment of FIG. 6.

Although the image captures 801-803 in FIG. 8 show finger 603 crossing the threshold A'B' in only one image, 802, additional such images may be acquired if the rate of image capture is increased (i.e., Δt is decreased). In general, increasing the data acquisition rate will increase the accuracy of the system.

Figure 11:
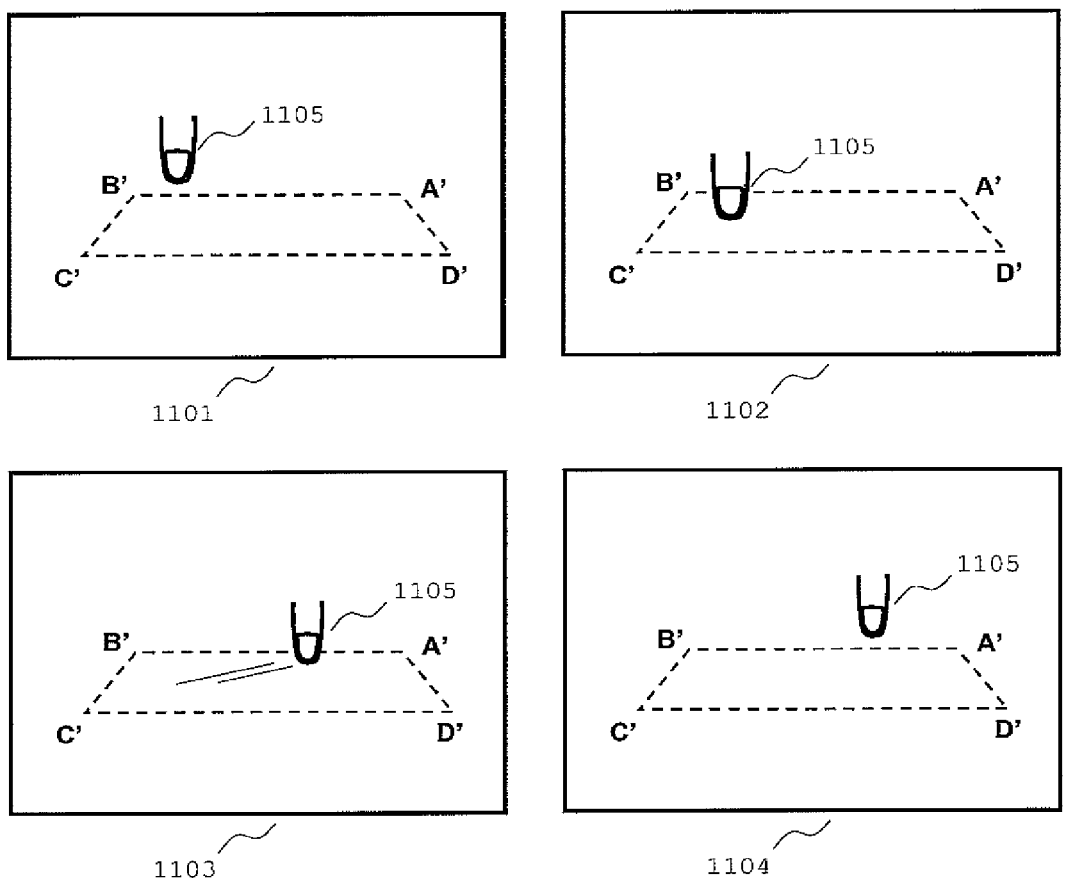
FIG. 11 illustrates another series of example images acquired by the video capturing device in the embodiment of FIG. 6.

As previously indicated, a tapping event in the input region may signify a key press or mouse click. Other forms of actuation, such as the sliding motion of an input object signifying mouse cursor movement, may also be determined using the aforementioned processing steps utilizing thresholds. Illustrated in FIG. 11 are image captures 1101-1104 of an input finger 1105 sliding over an input region. In image 1101, finger 1105 does not yet actuate the input region since it does not cross the threshold A'B'. In image 1102, finger 1105 actuates the input region as it crosses line A'B' and its tip falls within region A'B'C'D'. The next captured image 1103 shows that finger 1105 slides over to the left and rear (from the user's perspective, opposing the video capturing device) without being lifted. In image 1104, the input region is no longer actuated as finger 1105 does not cross the threshold A'B'. In this case, finger 1105 may have been lifted, or it may have slid outside of the input region.

Additional actuation parameters such as the tapping speed may be obtained from consecutive image frames. When the time interval Δt between the acquisition of consecutive image frames is fixed, a larger displacement in the position of the input object in the consecutive frames acquired indicates a faster tapping motion. Conversely, a smaller displacement in the position of the input object in the consecutive frames acquired indicates lower tapping speed.

Once an actuation event is determined to have occurred in step 506, the location parameter of the actuation within in the input region is determined in step 508. Returning to FIGS. 6-7, there exists a one-to-one mapping of points on the input region, such as points A, B, C, and D in FIG. 6, to those in a corresponding captured image, such as points A', B', C', and D in image capture 701 of FIG. 7. For a calibrated image plane (the plane containing a captured image), the mapping may be represented mathematically as: $Px=c/Sy\ Sx+Dx$, $Py=ch/Sy+Dy$, where $Sx$ and $Sy$ are coordinates of a point in the input region and $Px$ and $Py$ are the corresponding coordinates of the same point mapped to the captured image. Sy, which is greater than or equal to d (FIG. 6), is the perpendicular distance from the surface point to the vertical plane containing the focal point F of video capturing device 601. Sx is the perpendicular distance from the surface point to the vertical plane containing an origin O of the Cartesian coordinate system (Sx, Sy) and along the direction of Sy. c is a constant capturing scale factor that is determined by attributes of the capturing device, such as sensor resolution and focal length. Based on the mapping transformation between the image plane and the plane containing the input region, c can simply be measured through a process very similar to camera calibration, which utilizes a set of control points whose coordinates in both planes are known. c can be thus measured and then stored in the system during device manufacture prior to first usage. Dx and Dy are simply two constants that account for the shift of the origin reference point between the two coordinate systems. Thus, movements in the left or right direction on the input surface, which corresponds to changes in Sx, are mapped to movements in the horizontal direction in the captured image, which correspond to changes in Px in FIG. 7. Likewise, movements toward or away from the video capturing device on the input surface, which corresponds to changes in Sy, are mapped to movements in the vertical direction in the captured image, which correspond to changes in Py in FIG. 7.

In a preferred form of the invention, the distance d is greater than h. More preferably, the ratio of d to h will be from about 5:1 to about 10:1. In yet another preferred from of the invention, an angle α formed between plane 604 and the plane containing input region 602 is within the range of 35° to about 1°, and even more preferably from about 25° to about 1°, in order for plane 604 to be as near the input region 602 as possible. However, the resolution in the Sy direction may become as small as h/(d+w) of the resolution in the Sx direction. Depending on the capturing scale factor c, d may only increase to a certain range and yet still provide sufficient resolution in the Sy direction. Given the same resolution requirement, a larger value in c will permit a larger value in d as well.

The relationship between points in the input region 602, FIG. 6, with coordinates (Sx, Sy) and corresponding points in the captured image 701, FIG. 7, with coordinates (Px, Py) permits the mapping of virtual objects within the input region to their corresponding positions in the captured image. For example, if the positions of key regions on a virtual keyboard within the input region are fixed, their mapped positions in the captured image will also be fixed. This enables the key positions on the captured images to be known prior to usage and results in optimal efficiency during operation.

Once a tapping event has been identified or detected, determining the tapping location in a virtual keyboard amounts to determining the lowest vertical point on the outline of the input object (e.g., the fingertip of a tapping finger) that is within the input region during the tapping event. The outline of an input object may be obtained, for example, by applying image segmentation algorithms to the captured image of the object. Then, the actuated key within the virtual keyboard may be determined as the mapped key region on which the fingertip falls during the actuation. Similarly, if a virtual touchpad provided in an input region is actuated by a finger, the location (Sx, Sy) of the fingertip within the input region may be determined from the corresponding mapped location (Px, Py) in the captured image.

Upon determining the location of the actuation within the input region in step 508, the input object set that caused the actuation is then identified from a group of input objects in step 510. In one preferred form of the invention, the fingers of a human hand constitute the group of input objects and a single finger or a combination of these fingers can constitute an input object set. The identification of an object set may be achieved by identifying one or more of its distinguishing features from the image captures. For example, fingers comprising an input object set may be identified based on features that include, but are not limited to: size, shape, edge, vein pattern, nail color, skin texture, skin tone, pressure or area of contact with actuated key region, infrared properties, etc. In a preferred form of the invention, two or more of these features may be combined for better performance and accuracy.

Figure 12:
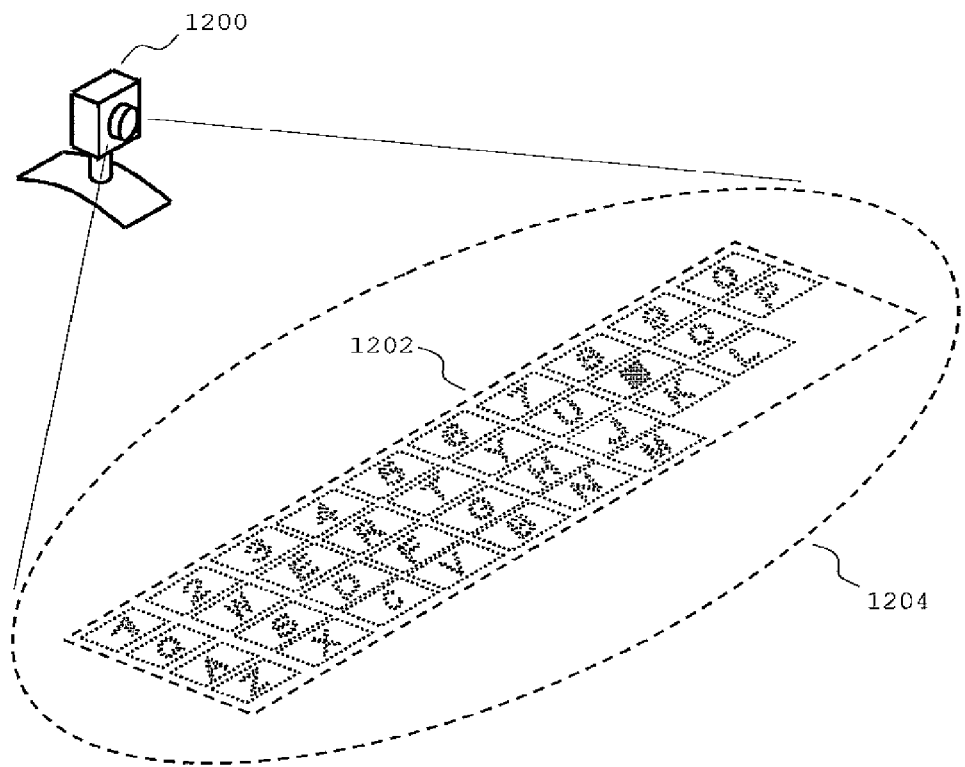
FIG. 12 illustrates a virtual QWERTY style keyboard interface as provided in some embodiments of the present invention.

A determination of the input symbol or function is made in step 512, based on the input region actuated, the location of the actuation, and the input object set identified. FIG. 12 illustrates a virtual QWERTY style keyboard 1202 provided in the input region 1204 that is within the view of a video capturing device 1200. For clarity of illustration, only numeric and alphabetic keys are shown. It is understood that many other keys, such as "@", "%", "Enter", etc., may be present in the keyboard 1202. The virtual keyboard 1202 is divided into key regions, one for each key. The key regions are, in this instance, fixed in location within the input region 1204.

With continuing reference to FIG. 12, the input symbol may be determined, for example, as the letter "s" in step 512, if the input region actuation was determined as a finger tapping event, the location of the actuation was determined to be within the key region of "s", and the input object set was identified from the group of fingers on a user's left hand as the left ring finger. If, however, the input region actuation was determined to be something other than a tapping (e.g., a sliding motion generated by a single finger), the determination of the input symbol may be aborted as that is not a valid actuation for a keyboard.

Figure 13:
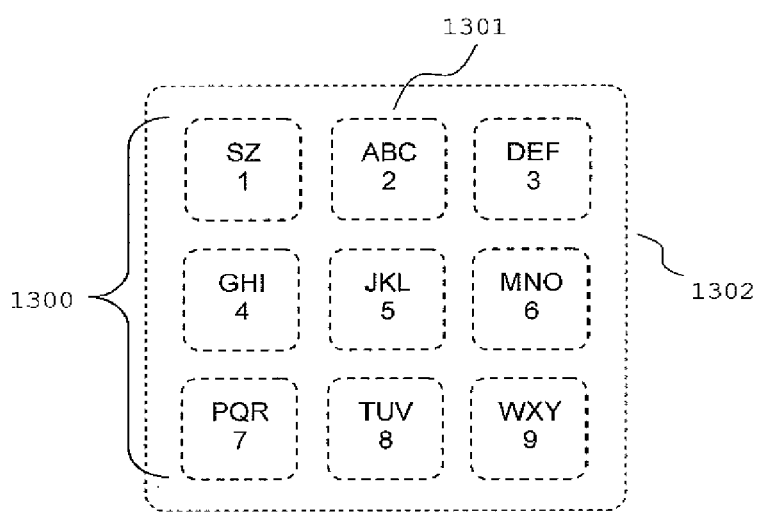
FIG. 13 illustrates a virtual phone keypad interface as provided in some embodiments of the present invention.

Besides the virtual QWERTY keyboard 1202, FIG. 12, other virtual interfaces, such as phone keypad, touch pad, and tablet may be provided in the input region 1204, FIG. 12, for user input. To illustrate, as shown in FIG. 13, a virtual phone keypad 1300 is provided in an input region 1302. For clarity of illustration, only the three rows of key needed for alphabetic input are shown. Note that the "S" symbol that is normally associated with the "7" key, as well as the "Z" symbol that is normally associated with the "9" key, have been assigned to the "1" key. This is just one of many possibilities that reduce the number of finger-to-symbol assignments to a maximum of three per key. As an example, the index, middle and ring fingers of a user's right hand may be assigned respectively to the letter symbols "A", "B" and "C" on the number "2" key 1301 of the phone keypad 1300. If the input region actuation was determined as a finger tapping event, the location of the actuation was determined to be within the key region of "2", and the input object set was identified from the group of fingers on a user's right hand as the ring finger, the letter "C" is determined directly as the input symbol. If, however, the input region actuation was determined to be something other than tapping (e.g., a sliding motion generated by a single finger), the determination of the input symbol may be aborted as that is not a valid actuation for a phone keypad. Currently, the de facto method for alphabetic entry on a phone keypad, known as "multi-tap", requires pressing the "2" key three times in order to enter "C". It is thus evident that touch typing for alphabetic input on the virtual phone keypad may be enabled via finger-to-symbol assignments, so that one keystroke per symbol input way be achieved just as on a QWERTY keyboard for touch typists A touchpad, or tablet, may be provided as another virtual interface in the input region 1204, FIG. 12, for user input. Since a tablet functions nearly identically to a touchpad in a virtual embodiment, they are described herein as a single virtual device. It is thus understood that the term "touchpad" may be used interchangeably herein with the "tablet". Although input on a conventional tablet is normally performed using an associated pen, the pen can be replaced using other objects such as fingers when the tablet is virtual. As will be evident from the following description, using fingers for input enables a rich set of functionality not inherently available in conventional tablets.

Figure 14:
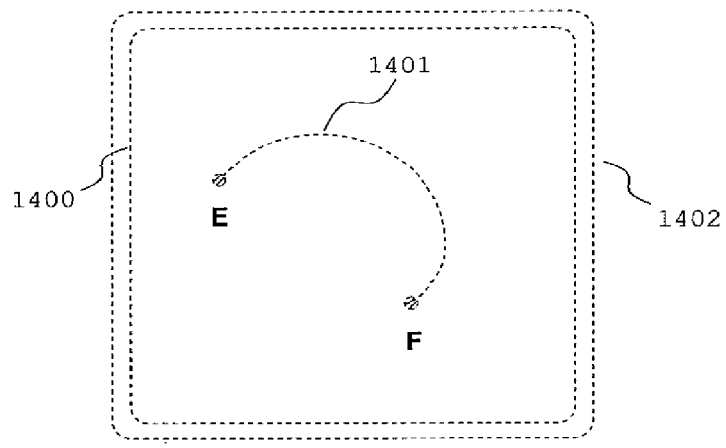
FIG. 14 illustrates a virtual touchpad or tablet interface as provided in some embodiments of the present invention.

Referring to FIG. 14, a virtual touchpad 1400 is provided in an input region 1402. It is worth noting that there may be no "buttons" in touchpad 1400 that an e normally found in its physical counterpart. "Clicks" can be performed by simply tapping in-place anywhere on the touchpad area. If, for example, the input region actuation was determined to be a finger tapping event, the location of the actuation was determined to be at the point E, and the input object set was identified from the group of fingers on a user's right hand as the index finger, the input in this case may be determined in step 512, as a "left click" on the touchpad 1400. This is just one of the many finger-to-function assignments possible. For instance, tapping of a right middle finger, instead of the right index finger, may be assigned to the "left click" function. Alternatively, tapping of the right middle finger may be assigned to the "right click" function.

As another example, the input region actuation was determined as a sliding motion 1401 that originated at the point E and terminated at the point F, and the input object set was identified from the group of fingers on a user's right hand as the index finger, the input in this case may be determined in step 512, FIG. 5, as a cursor movement on the touchpad 1400. Depending on the system's mode of input, the sliding motion 1401 by the right index finger may be determined alternatively as a "next" function in the selection of an item from a group of items in a menu.

When operating as a tablet, sliding motions on input region 1400 may cause a corresponding trace to be rendered on an output display. As may be determined in step 512 of FIG. 5, for example, the sliding motion 1401 in input region 1400 caused by a right index finger as the input object set could result in a corresponding trace of a certain width, e.g., 1 mm, to be output on a display. If, as another example, the sliding motion 1401 in input region 1400 was caused by a different finger such as the right middle finger, the corresponding trace of a different width, e.g., 5 mm, may be output on the display. Besides trace widths, other characteristics, such as colors and patterns, may be assigned to the different possible input object sets.

While the foregoing discussion with respect to the determination of input symbol or function on a virtual touchpad was focused on the input object set comprising a single object, e.g., one finger, it is understood that the same principles may be extended to apply to any combination of input objects (e.g., index and middle finger). Skilled artisans will appreciate that the application of the above methods to multiple input objects could enable advanced user interface features such as enhanced multi-touch functionality on an input region. Such enhanced multi-touch functionality differs from conventional multi-touch capability in that the identifying of the input object set factors into the determination of the input. Thus, a different input object set generating the same movement determines a different multi-touch input. It will be further appreciated that this enablement does not require any modification in hardware; only changes in the software instructions stored in the memory unit 104, FIG. 1, will be sufficient to support the multi-touch feature. In a preferred form of the current invention incorporating enhanced multi-touch functionality, a useful actuation parameter determined from the data acquisition performed m step 508 is the relative location between the input fingers during actuation.

Figure 15:
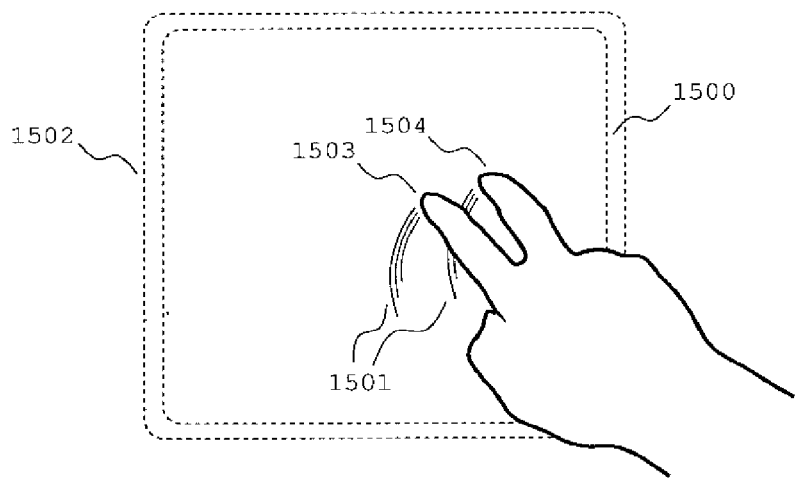
FIG. 15 illustrates a multi-touch motion generated by two fingers on a virtual touchpad or tablet interface as provided in some embodiments of the present invention.

In one example of an input region actuation caused by an input object set comprising two fingers, a sliding motion such as 1501, FIG. 15, is generated in the virtual touchpad 1500 of input region 1502 with an index and a middle finger, 1503 and 1504, of a user's right hand. This may be used to signify a "drag & drop" input operation since sliding the index finger may be determined as cursor movement while the presence of the other finger may be determined as a simultaneous "hold" function at the same time. In another example, the same sliding motion 1501 caused by the index and middle fingers, 1503 and 1504, in virtual touchpad 1500 may be determined in step 512, FIG. 5, as a "scroll up" function for a web browser application. However, if the input object set making the sliding motion 1501 comprises a different set of fingers, such as an index and ringer finger, then the input determined in step 512 may be something different, such as a "page up" function. It is understood that numerous other combination of fingers and input region actuations are possible for representing various input symbols and functions.

Incorporating the identifying of the input object set in step 510, into the determination of the input symbol or function, step 512, also enables an alternative method for determining key region actuation in virtual keyboards. Such methods involve the notion of "relative" key location, in contrast to the notion of "absolute" key location that has been described with reference to FIGS. 6-7. That is, the actuation location for a key region is not determined in step 508 based on its coordinates (Sx, Sy) in an input region but rather on its location relative to a reference (e.g., a palm, a face, etc.). Similarly, the actuation location for a key region may also be determined based on the posture of the actuating input object set (e.g., the orientation of a tapping finger or its phalanges). This concept of the relative key location will become more evident by way of examples below.

Figure 16:
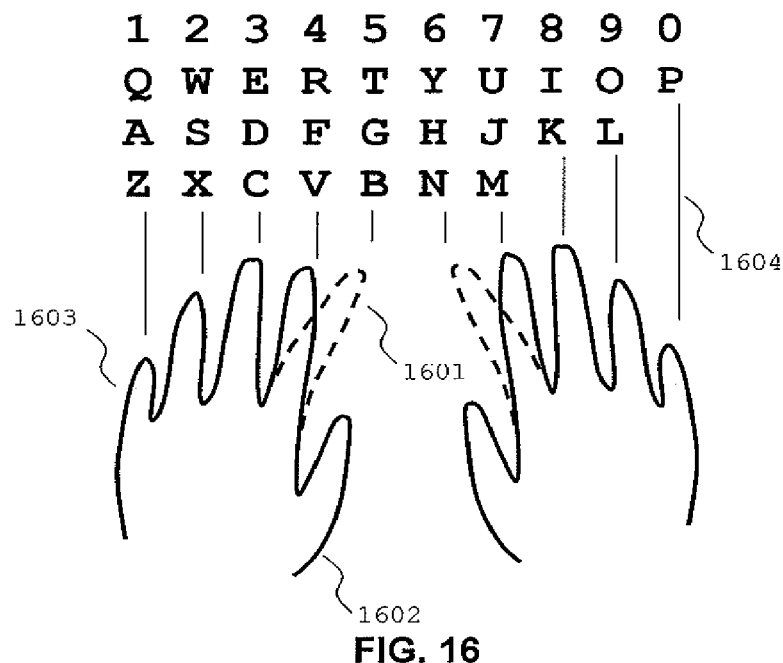
FIG. 16 illustrates the finger-to-symbol assignments for touch typing on a conventional QWERTY keyboard.

To illustrate, the finger-to-symbol assignments 1604 for touch typing on a conventional QWERTY keyboard is depicted in FIG. 16. For clarity of illustration, only numeric and alphabetic symbols are shown. For example, the left little finger 1603 is assigned to input a unique symbol on each row of the keyboard: "I" on the top row, "Q" on the second row, "A" on the third row, and so on. The only exceptions are the index fingers which are responsible for two symbols on each row. For example, left index finger 1601 of the left hand 1602 is used to input both the symbols "R" and "T" on the second row. Identifying the input object set in step 510 of the input process 516, FIG. 5 enables a QWERTY keyboard with a reduced number of keys for touch typists, as shown in FIG. 17.

Figure 17:
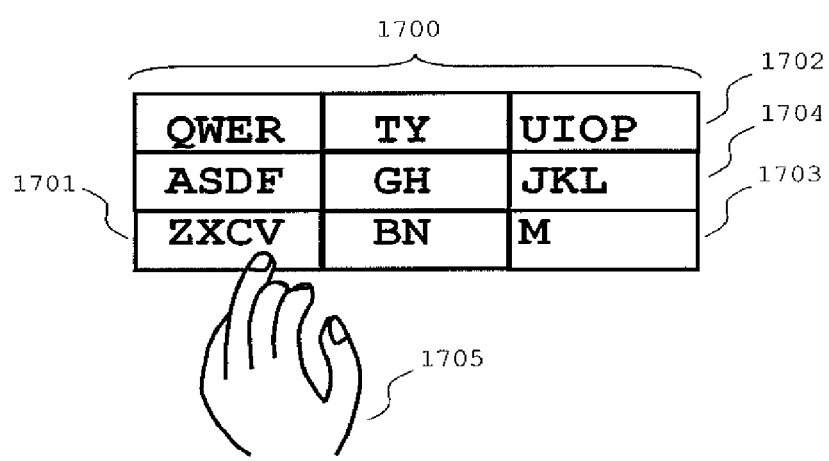
FIG. 17 illustrates a portion of a modified version of a conventional QWERTY style keyboard suitable for virtual input according to the present invention.

FIG. 17 depicts a keyboard 1700 wherein the input symbols "Z", "X", "C", and "V" are merged into a single key 1701. The same is true of the symbols "A", "S", "D", and "F", and so on. Note that keyboard 1700 contains only alphabetical symbols, corresponding to an alphabetic mode of input. To input the symbol "X" on key 1701, for example, the ring finger of a user's left hand 1705 may be used to select it directly by pressing the "ZXCV" key 1701. This is due to the finger-to-symbol assignments 1604 shown in FIG. 16, wherein a left-hand finger is uniquely assigned to each symbol in key 1701. Since the left ring finger is assigned to the symbol "X", that symbol is selected as input regardless of the exact location of actuation on key 1701, as long as the left ring finger is used to cause the actuation as shown in FIG. 17. Thus, the precise location of actuation does not matter when selecting symbols within the same key for input. Selecting a symbol associated with a different key struck with the same hand will require the assigned finger to be extended correspondingly in order to select that symbol.

Figure 18:
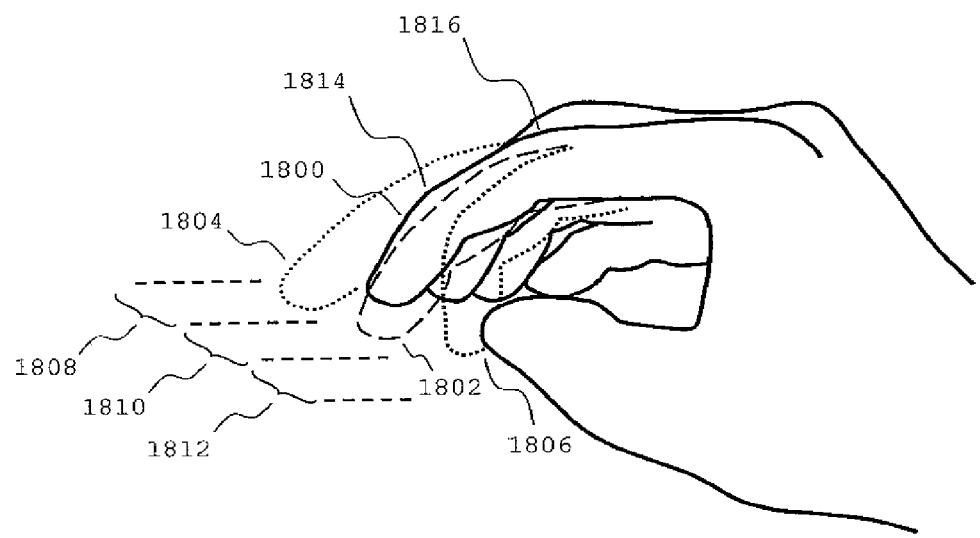
FIG. 18 illustrates the example postures of an index finger while actuating various keys in the keyboard of FIG. 17.
Figure 19:
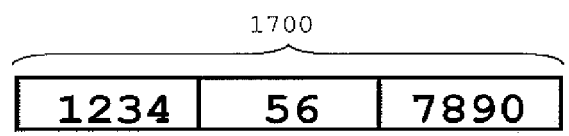
FIG. 19 illustrates another portion of a modified version of a conventional QWERTY style keyboard suitable for virtual input according to the present invention.

To elaborate further in conjunction with FIG. 18, assuming that a user rests all ten of his fingers in a "home row" gesture over the middle row of alphabetical keys (with the symbols "A", "S", "D", etc.), as is normally done in touch typing when they are not pressing a key, selecting the symbol "U" would require the user to extend 1804 his right index finger 1800 forward while pressing down 1804 on the "UIOP" key 1702 on the top row 1808 of keyboard 1700. To select the symbol "M" on the bottom row 1812, however, the user would pull back 1806 his right index finger 1800 while pressing down 1806 on the "M" key 1703. To select the symbol "J" in the "JKL" key 1704 in the middle or home row 1810, the user would simply press down 1802 his right index finger 1800 "in place". Selecting any one of the symbols "Y", "H" and "N" in the neighboring key column to the left would require the user to protrude his right index finger to the left while making the same gesture as for the corresponding row of the symbol. One alternative to protruding the right index finger to the left when accessing the symbols "Y", "H" or "N" is to use an input object set comprising the user's right index and middle fingers to actuation the keys 1702, 1704 or 1703, respectively. FIG. 19 provides an illustration of the keyboard 1700 in a numeric mode of input. Since there is only one row of keys in this mode, fingers need not extend forward or pull back when selecting symbols for input. To access the symbol "5" or "6", however, the assigned left or right index finger would extend correspondingly to the right or left, respectively.

Selection of symbols such as "T", "Y", "G", etc. in the middle key column of keyboard 1700 for input may also be determined via a combination of relative location and finger posture. For example, the location of a right index fingertip relative to the neighboring middle finger tip in conjunction with the posture of the right index finger may be used to determine whether the input symbol is "Y", "H", or "N".

In a virtual embodiment of a QWERTY keyboard 1700, a determination of the location of key actuation may be made based on its location relative to a reference, e.g., the position set by fingers resting in a home row gesture. Similarly, the location of key actuation may also be determined based on the posture of an actuating finger. As an example, a key region in the top row may be actuated by finger 1n in a forward extended posture while pressing down, whereas a key region in the bottom row may be actuated by a finger in a pulled back posture while pressing down. It is understood that additional input modes, such as one for inputting special symbols and functions (e.g., "@", "$", etc.) that are not part of normal numeric or alphabetic input, may be provided by the virtual embodiment of keyboard 1700. Switching between these modes may be achieved via a particular actuation gesture in an assigned location of the input region of the keyboard. For instance, a mode switching function may be accomplished by extending a user's left and right index fingers at the center of the input region. It is understood that many other gesture and location combinations may be used for the purpose of mode switching. It is further understood that the aforementioned special symbols and functions may be assigned to corresponding fingers in a manner similar to that described with reference to FIG. 16, in order that these symbols and functions may be input using conventional touch typing methods. For example, in a special mode the symbol "1" may be assigned to the key region for "A" so that "!" may be input in the same manner as selecting "A" during touch typing.

Similar to the sh01icut keys on many of the existing input devices, certain gesture and location combinations may be reserved for changing input modes, which include different input methods (e.g., mouse/touchpad, keyboards, identifying of fingers disabled, etc.), keyboard layouts (e.g., character and function sets for various languages), and the receiving device of the input. Besides input modes, other symbols or functions may be determined via combinations of particular gestures and locations. For example, a section on the left half of an input region for a touchpad is divided into an upper and a lower half, wherein the upper left half is designated for a "page up" function and the lower left half is designated for a "page down" function. Ordinarily, the entire input region may be designated for touchpad input. However, if and only if a user's right index and ring fingers posing in a "V" gesture are detected as tapping within the "page up" or "page down" regions, then the corresponding page up/down function is input.

Some gesture and location combinations may be reserved to allow users to rest their hands and fingers on a particular location or anywhere within the input region while no input is taking place. These combination of gestures and locations, hereafter referred to as "resting gestures", prevent accidental input while the user rests his fingers or input objects on the input region. A typical example is the "home row" gesture formed with all fingers of a hand or both hands touching the input region. Certain resting gestures may be reserved only for a particular location within the input region but assigned to other functions in other locations. In one embodiment, the system may map a detected gesture and location combination to: 1) a valid input symbol or function, 2) a resting gesture, or 3) an undefined input. The system will not determine an input for the resting gesture although certain assisting features such as visual or audible cues may be used to indicate the presence of a resting gesture. Undefined inputs may be treated in two different ways. The system may treat them the same as resting gestures so that any input region actuation not corresponding to a valid input is by default treated as a resting gesture. In other words, these undefined inputs generate resting functions. Alternatively, the system may take a different set of actions such as alerting users to the detection of an unrecognized input using visual or audible cues, or simply ignore them.

The previously described applications of relative key locations and finger postures may also be used in a virtual embodiment of the phone keypad 1300, FIG. 13. In this case, the reference position set by fingers resting in a home row gesture is preferably taken as the "5" key in the center row and column.

Returning to FIG. 18, it is apparent that the determination of key locations in a virtual embodiment of keyboard 1700 based on relative key locations may be achieved by setting key locations relative to the hand's palm, as the fingertip-to-palm distances in a user's home row gesture remain mostly constant during input. In some settings, depending on the position and view of the video capturing device, it may be more effective to use the knuckles of a hand as reference instead of the palm. In other words, the individual knuckles may serve as the reference for their corresponding fingers in determining relative key locations.

Figure 20:
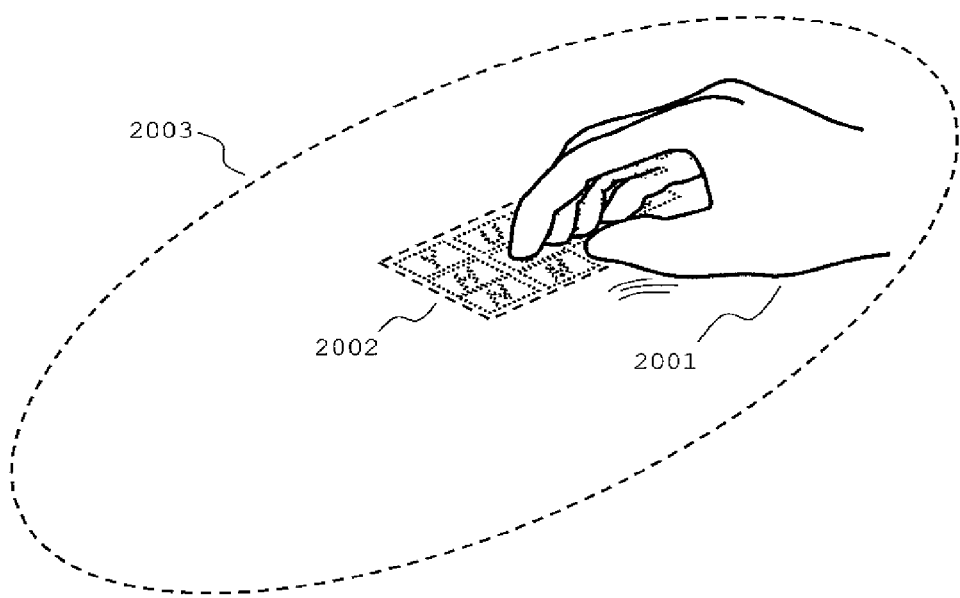
FIG. 20 illustrates a portion of a virtual keyboard that dynamically changes its location in relation to a reference.

Utilizing the palm or knuckles of a hand as the reference position for a virtual keyboard provides benefits not available in embodiments based on absolute key locations. For example, the position of a virtual keyboard within an input region may be adjusted, in real-time during usage, in a fixed relation to a user's palm of a user's hand. This will allow greater accuracy and comfort during typing since a user's hands may drift without any tactile feedback normally provided by physical keys. In addition, a QWERTY style keyboard may be further split into a left half and a right half, wherein the location of key regions in each half may be adjusted individually in relation to the corresponding palm or knuckles of a user's hand. This is depicted in FIG. 20. For clarity of illustration, only the right hand 2001 and the right half 2002 of the virtual keyboard is shown within the input region 2003. Image segmentation algorithms may be applied to the image captures of the hand in order to locate the palm or knuckles area.

In one embodiment, a depth sensing device consisting of a pair of video capture devices may be used to detect the 3-D coordinates of an actuation location and its reference. The relative actuation location can then be simply derived by calculating the difference between these two 3-D coordinates. A simple and effective means of determining finger posture during tapping events, as apparent from the example of the right index finger 1800 provided in FIG. 18, may be achieved by detecting the relative locations of the different joints, such as 1814 and 1816, of the finger. The determination of the relative locations of the various joints of a finger may also be significantly simplified when a depth sensor is used in place of, or in conjunction with, the video capturing device 601, FIG. 6, in the embodiment under consideration. In one example of a depth sensor, depth-wise coordinate information may be obtained by directing a laser or IR beam across an input region, and then measuring a thickness of the image of the beam reflecting off of input object(s). In another example, the depth-wise coordinate information may be obtained by directing two beams across the input region and then measuring a separation distance of the two beams in the image of the reflection. In addition, when two video capturing devices are utilized to acquire input object information, as will be subsequently described in an embodiment of the present invention, detecting the relative locations of the various finger joints can be easily accomplished.

Besides location, changes in other properties of the reference object(s) may trigger a corresponding change in the virtual input devices. Some examples of these properties are: orientation, size, posture and presence. For instance, rotating a user's hands may cause the orientation of the virtual keyboard, such as 2002 of FIG. 20 or 1300 of FIG. 13, to rotate accordingly. As another example, key regions may be spaced farther apart when fingers are spread out, or, when bigger hands are detected. Additionally, a vil lual keyboard and its key regions may become larger when a dedicated retractable panel on which the virtual keyboard is provided is extended further for input. A QWERTY style keyboard layout may be provided for input when both hands are present in a typing position and a phone keypad layout may be provided when only one of the user's hands is present for typing.

Additional means for acquiring position information of the reference objects are provided herein. Active sensors or transmitters may be placed on the reference object to send its position information to the input module, such as via Bluetooth or other communication means. Passive sensors or markers with special patterns may be used to help identify and locate the reference object so that the remote data acquisition device provided by the input module may then be able to identify the special pattern(s) on the sensor or marker and locate the reference object. To illustrate, a unique light pattern such as a red star may be projected on to the surface of the reference object so that the system may capture this pattern and identify it using pattern recognition algorithms. Once the reference positions are established, the location of the virtual input device may be adjusted correspondingly.

Figure 21:
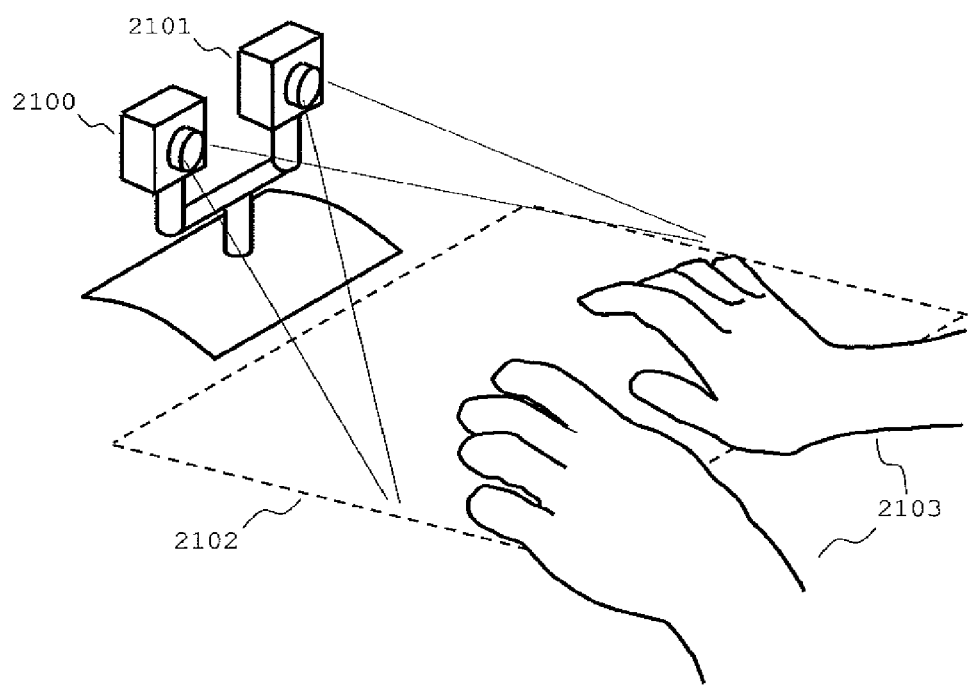
FIG. 21 illustrates one exemplary embodiment of the present invention for receiving virtual input using two video capturing devices.

In another embodiment of the present invention, illustrated in FIG. 21, the input module 106, FIG. 1, provides two video capturing devices 2100 and 2101, disposed horizontally adjacent to one another but possibly separated by a small distance, to perform remote data acquisition on an input region 2102 for a virtual device. Again, the video capturing devices 2100 and 2101 may be conventional video cameras or IR cameras. Unlike the single video capturing device embodiment shown in FIG. 6, the capturing devices 2100 and 2101 need not be disposed proximate the work surface containing the input region 2102 as they are capable of acquiring depth information from their captured images. Also illustrated in FIG. 21 are a user's hands 2103, assuming a position that is typical in normal touch typing on a virtual QWERTY style keyboard.

The processing of virtual input in the embodiment of FIG. 21 may be carried out according to process 516, FIG. 5, in the same manner as that for the embodiment described with respect to FIG. 6. Those of ordinary skill in the art will appreciate that two video cameras configured as shown in FIG. 21 may be used to achieve stereo vision by capturing two separate images of a view and reconstructing its three-dimensional (3D) information based on the disparity of corresponding pixels within the two calibrated images. This may be useful as the system could filter out noise or other signals/data located beyond the input objects of interest. Once 3D information of the view is obtained, it would be straightforward to determine any contact with, or crossing of, a "threshold" plane by an input object set. Thus, the plane in which an input region lies may be used in step 506, to directly determine whether an actuation has occurred in the input region.

Figure 22:
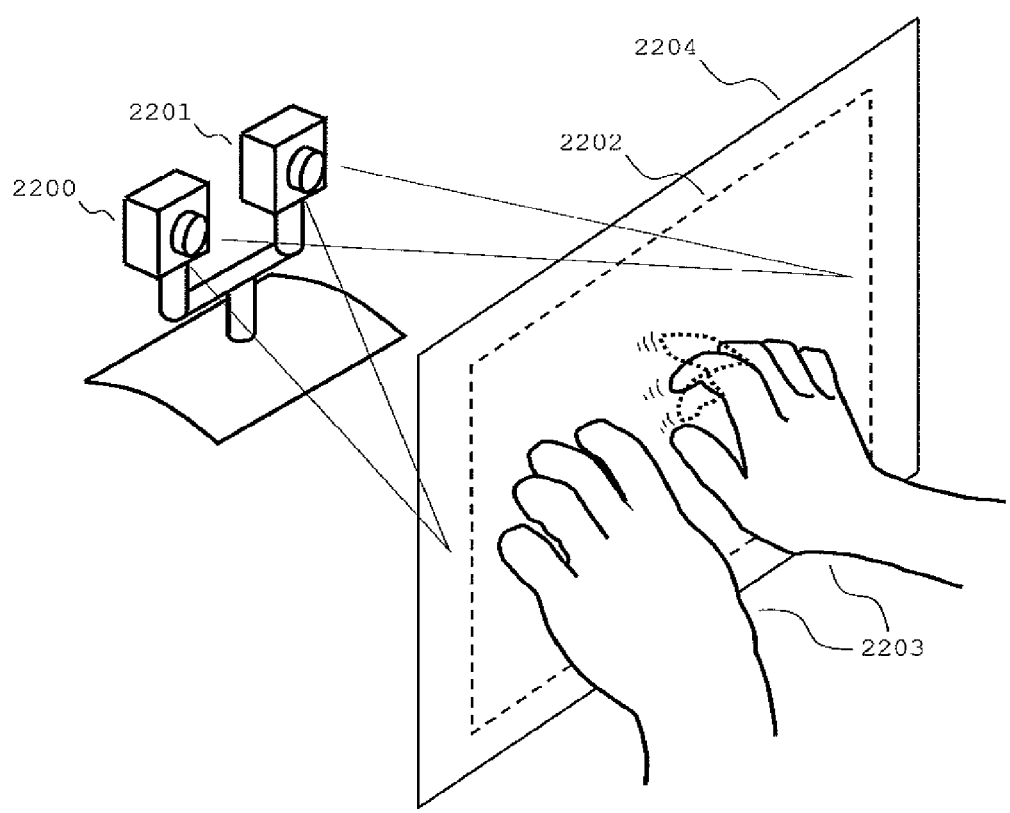
FIG. 22 illustrates a modified version of the embodiment of FIG. 21.

Given the depth perception capabilities of the video capturing device configuration, an input region may take on various orientations in 3D space. Illustrated in FIG. 22 is one example of an input region 2202 lying in a plane 2204 that is orthogonal to the lines of sight of the pair of video capturing devices 2100 and 2101. Note that plane 2204 is conceptual in nature and extends infinitely in all directions, although it is illustrated in FIG. 22 as finite. A user's hands 2103 are shown in a position that is typical in normal touch typing on a virtual QWERTY style keyboard. This may give the perception that the user is "typing in mid-air."

The input region 2202, FIG. 22, may be fixed or non-fixed in location within the plane 2204. A fixed input region 2202 allows it to be designated and stored during device manufacture, so that the system may be able to inherently determine the input area during usage. Although the input region 2202 illustrated in FIG. 22 is a rectangle, many other shapes, such as circle, ellipse, triangle, etc. may be used and the principles described herein also apply. Additionally, the surface of the input region 2202 need not be flat as long as the capturing devices 2100 and 2101 has a complete view of the entire region.

If the input region 2202 is not fixed within the plane 2204, its location must be dynamically determined every time prior to or during usage. This may be achieved via an initialization process, such as using a particular gesture or object(s) to designate on the input region some reference position of the virtual input device. For example, a user may place all ten fingers together in a "home row" gesture within the input region to indicate as reference position the middle row of keys in a virtual QWERTY keyboard. Assuming a pre-determined size and shape for the input region, its perimeters may then be obtained on-the-fly based on the user-designated reference position.

Various types of virtual input devices may be provided in the input region 2202. These include, but not limited to: QWERTY style keyboards, phone keypads, and touchpads and tablets with enhanced multi-touch capabilities.

Virtual input in the exemplary embodiment of FIG. 22 may be determined according to process 516, FIG. 5. In step 502, the video capturing devices 2100 and 2101 remotely capture input object information from the input region 2202 in a series of image frames. As previously indicated, depth information of the input object(s) may be acquired from this information. In step 503, preprocessing operations such as color balance, brightness adjustment, sharpening enhancement, and the like are performed on the remotely captured image frames to simplify the remaining processing steps. The system subsequently determines from the image frames whether an actuation of the input region has occurred in step 506. Such determinations may be made using the method based on thresholds described previously. Note that the plane 2204 containing the input region 2202 may itself serve as the "threshold" plane in determining whether an actuation event is caused by an input object set. Some examples of actuation events are tapping, sliding motion, and "home row" gesture. It is understood that numerous other actuation events are possible.

The determination of the location of the actuation in step 508 depends on several factors, such as whether the virtual device provided within the input region 2202 is fixed in location or positioned in a fixed relation to some reference such as the palm of a user's hand(s). If the virtual input device is fixed, the location of the actuation with coordinates (Sx, Sy) in the input region can be derived in a straightforward manner from the corresponding coordinates (Px, Py) in the captured image frames. If the virtual input device is dynamic in location, then methods based on determination of the posture of the input object set may be used.

Upon determining the location of the actuation within the input region in step 508, the input object set that caused the actuation is then identified from a group of input objects in step 510. The identification of an object set may be achieved by identifying one or more of its distinguishing features from the image captures. For example, fingers comprising an input object set may be identified based on features that include, but are not limited to; size, shape, edge, vein pattern, nail color, skin texture, skin tone, pressure or area of contact with actuated key region, infrared properties, etc. Two or more of these features may be combined for better performance and accuracy. Finally, a determination of the input symbol or function is made in step 512, based on the combination of input region actuation, location of the actuation, and the input object set identified.

Figure 23:
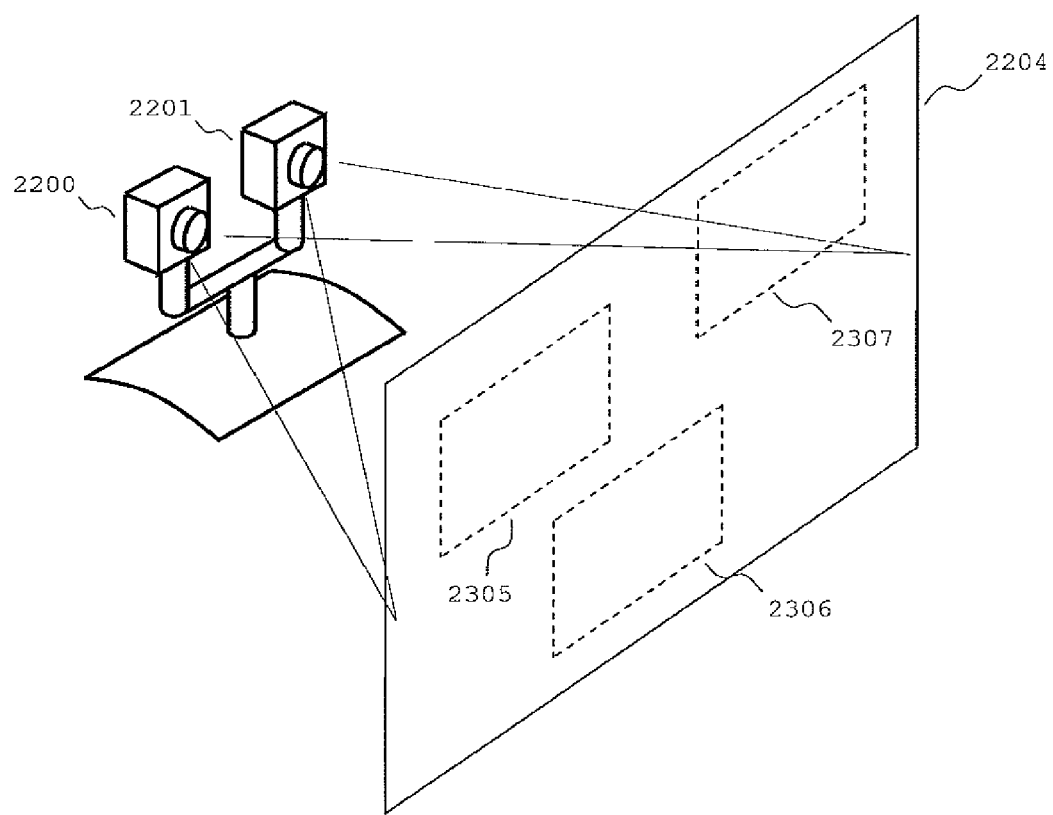
FIG. 23 illustrates a modified version of the embodiment of FIG. 22.

Skilled artisans will appreciate that the exemplary embodiment of FIG. 22 may be easily extended to provide two or more input regions in the plane 2204, as shown in FIG. 23. Although only input regions 2305, 2306 and 2307 are shown in FIG. 23, it is understood that additional regions may be provided. For example, separate virtual input devices, such as a QWERTY style keyboard, a numeric keypad and a touchpad, may be provided, respectively, in input regions 2305, 2306 and 2307. These input regions may be assigned to one or more users in an application. In one scenario, each region is assigned to a different user so that multiple users may be able to simultaneously use a single module to enter data for one or more data entry devices by inputting in their individual regions. During processing, the system first determines all actuation events acquired by the video capturing devices, and then sends the acquired actuation information to the respective data entry devices for further processing based on the individual actuation location.

Figure 24:
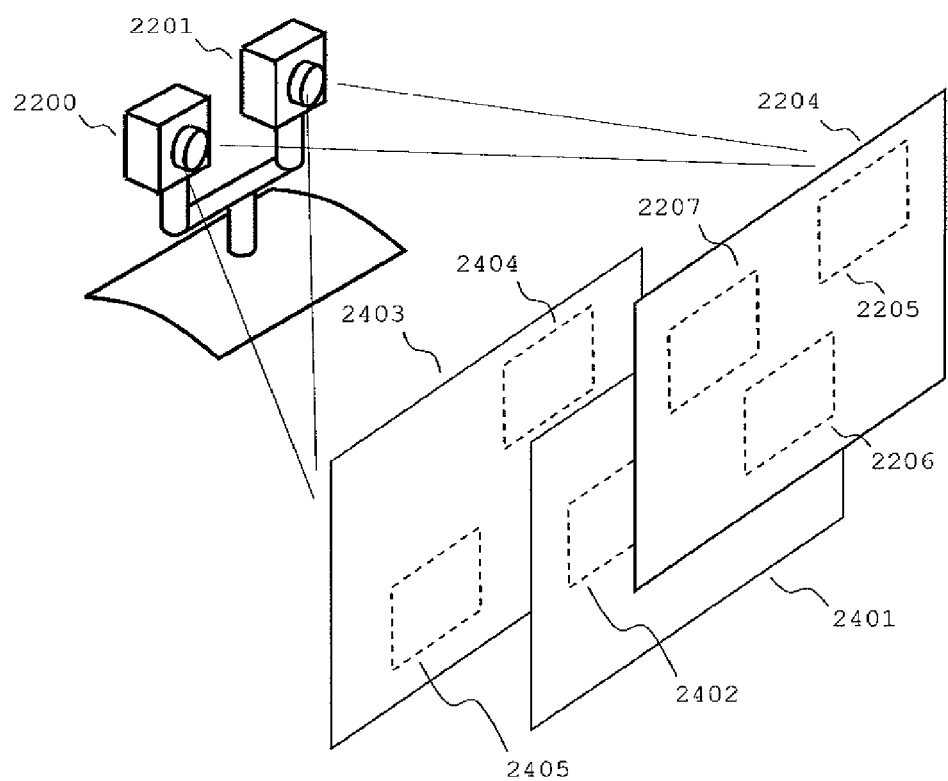
FIG. 24 illustrates a modified version of the embodiment of FIG. 23.

Skilled artisans will also appreciate that the exemplary embodiment of FIG. 23 may be further extended to provide additional input regions lying in two or more individual planes. As shown in FIG. 24, besides input regions 2207, 2205 and 2206 that lie within plane 2204, additional input regions 2402, 2404 and 2405 are provided in separate planes 2401 and 2403 that are at different distances from the devices 2100 and 2101 and parallel to plane 2204. Although only three planes are shown in FIG. 24, it is understood that additional planes may be present. It is further understood that the planes need not be parallel, as they may take on various orientations. The parallel planes 2401, 2403 and 2204 in FIG. 24 containing various input regions enables a layered input method in which input object sets, from the same or different user(s), actuating on the different planes would generate different input symbols or function on the same or different data entry devices. For instance, in a gaming application, various virtual musical instruments may be provided in the input regions within the different planes, thus allowing users to play piano, for example, in input region 2206, guitar in input region 2402, drum in input region 2405, etc. all at once.

The location of each input region may be adjusted dynamically in a fixed relation to a reference, such as a user's face, shoulders or chest, a corner of the data entry device's retractable panel dedicated for virtual input, a projected point or line on a surface, etc. In one example, an input region lies within a vertical plane that is fixed at one foot distance in front of a user's face. In such cases, the following steps may be used to process user input: 1) detect faces within the captured image frames; 2) assign input region and virtual input device based on the face locations; and 3) carry out process 516 on the assigned input regions.

Figure 25:
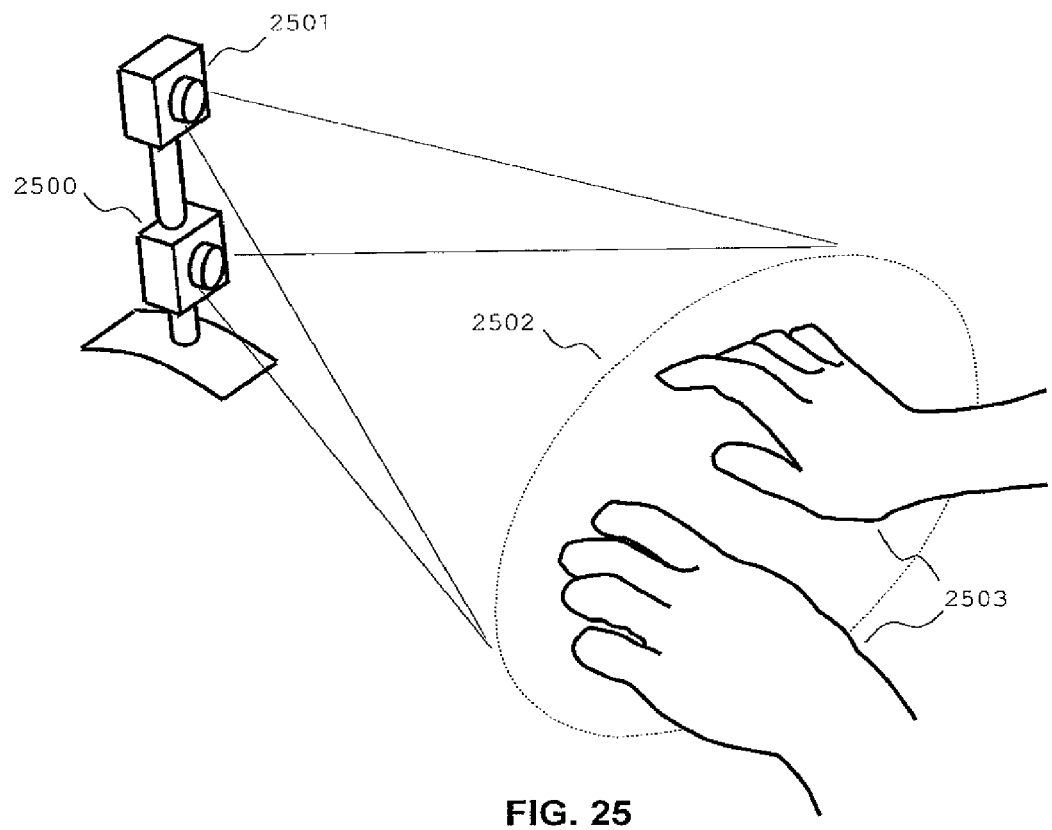
FIG. 25 illustrates another exemplary embodiment of the present invention for receiving virtual input using two video capturing devices.

Yet another embodiment of the present invention, illustrated in FIG. 25, the input module 106, FIG. 1, provides two video capturing devices 2500 and 2501, disposed vertically adjacent to one another but possibly separated by a small distance, to perform remote data acquisition on an input region 2502 for a virtual device. Again, the video capturing devices 2500 and 2501 may be conventional video cameras or IR cameras. It is not necessary that the capturing devices 2500 and 2501 be disposed proximate the work surface containing the input region 2502 since they are capable of acquiring depth information from their captured images. Also illustrated in FIG. 25 are a user's hands 2503, assuming a position that is typical in normal touch typing on a virtual QWERTY style keyboard.

Instead of acquiring depth information from the input region and actuating object(s) by stereo vision, the video capturing devices 2500 and 2501 shown in FIG. 25 may be configured to operate separately. For example, device 2500 may be allocated to determining an actuation of the input region, while device 2501 may be allocated to determining the location of the actuation. Either one or both devices may be allocated to identifying the input object set.

Figure 26:
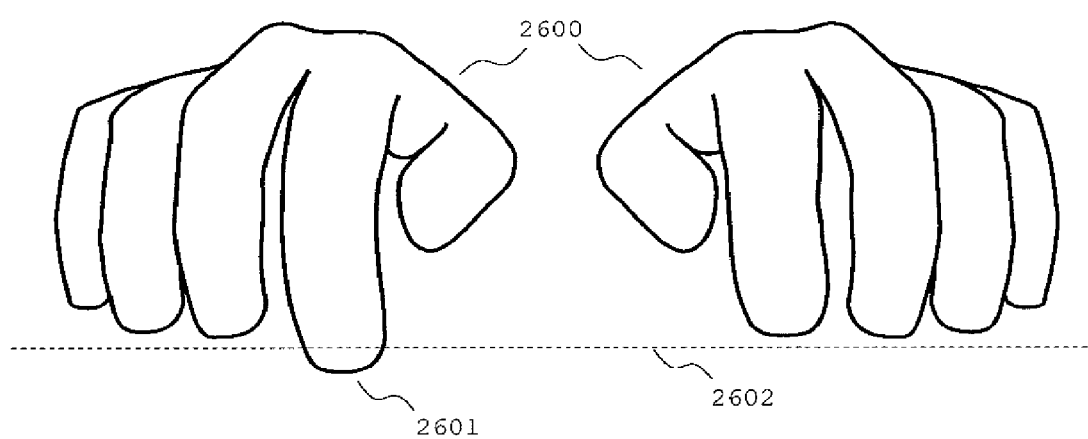
FIG. 26 illustrates an example image acquired by the lower video capturing device in the embodiment of FIG. 25 operating in one configuration.
Figure 27:
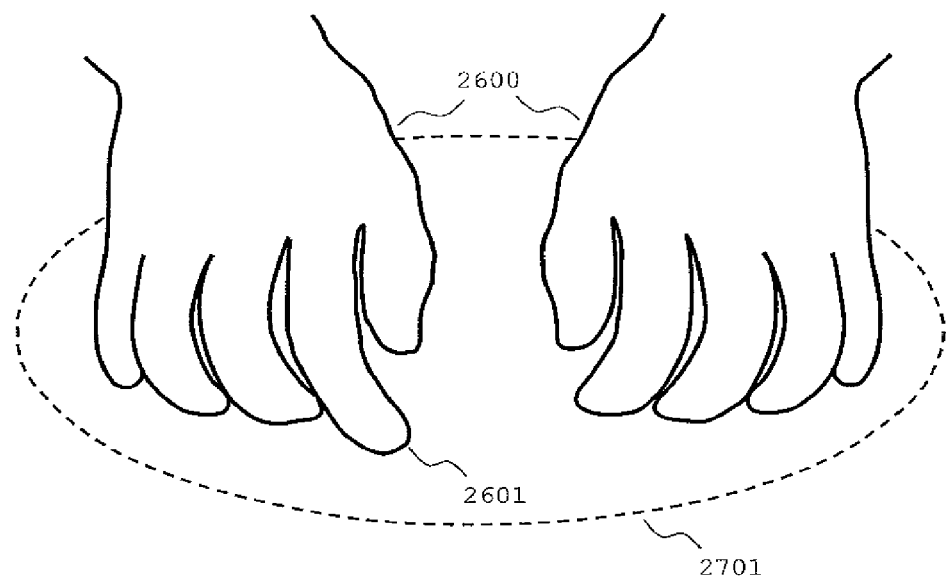
FIG. 27 illustrates an example image acquired by the upper video capturing device in the embodiment of FIG. 25 operating in another configuration.

To further illustrate, FIG. 26 depicts an image of a user's hands 2600, typing on a virtual keyboard, that may be captured by device 2500 and FIG. 27 depicts an image of the same hands 2600 that may be captured by device 2501. The actuation of the input region 2701 by the left index finger 2601 may be determined from FIG. 26 as finger 2601 crosses a preset threshold 2602. The particular location of actuation may be determined from FIG. 27 since it contains the coordinate information. Although information from FIG. 27 alone may be used to identify the actuating finger along with the actuated key region, knowledge of the horizontal position where the actuating finger 2601 crossed threshold 2602 from FIG. 26 will simplify the tasks.

Conversely, other information captured by device 2501, such as the speed, rate of acceleration, and size of the typing finger, may facilitate the determination of an input region actuation. For example, a key stroke is typically characterized by the extension of an actuating finger followed by its retraction, resulting in a brief pause when the actuating finger makes contact with the virtual keyboard. Knowledge of such information from the captures of device 2501 may help to confirm the determination of an actuation event as obtained from the captures of device 2500.

Instead of using a camera capable of real-time video capture and analysis such as device 2500, FIG. 25, other object detection sensors may be used. One example is the infrared sensors that trigger upon the detection of an object coming within a preset distance of the sensor. Many other sensors that detect object presence by measuring the feedback from signal(s) they emit may also be used for the purpose of determining actuation events.

Figure 28:
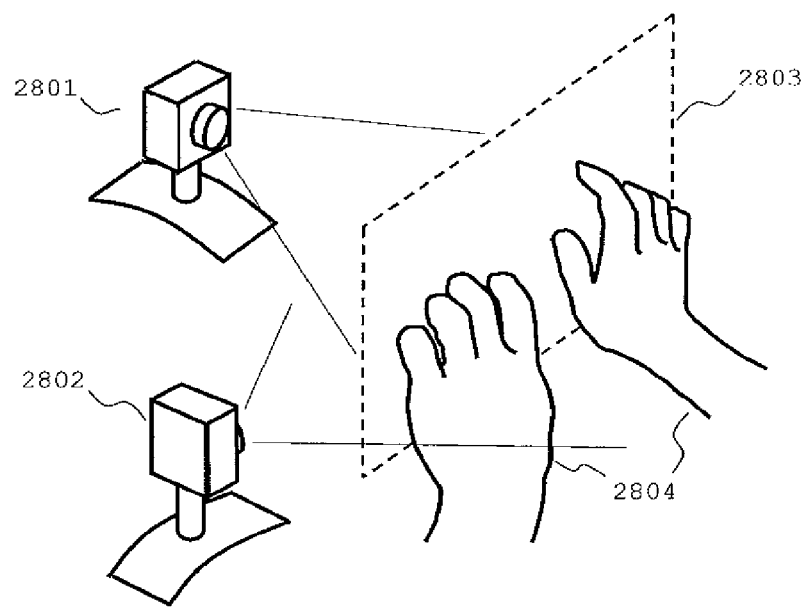
FIG. 28 illustrates yet another exemplary embodiment of the present invention for receiving virtual input using two video capturing devices.

In another configuration, the input module 106, FIG. 1, provides two video capturing devices 2802 and 2801, disposed as shown in FIG. 28. Device 2801 is configured to capture information from the input region and actuating object(s) from a front perspective while device 2802 is configured to capture such information from a side perspective. Thus, information acquired by device 2802 may be used to determine input region actuation by detecting penetration of the threshold plane 2803 caused by fingers of a user's hands 2804. Device 2801 may be used to capture information for determining the location of an actuation and identifying the actuating fingers.

Figure 29:
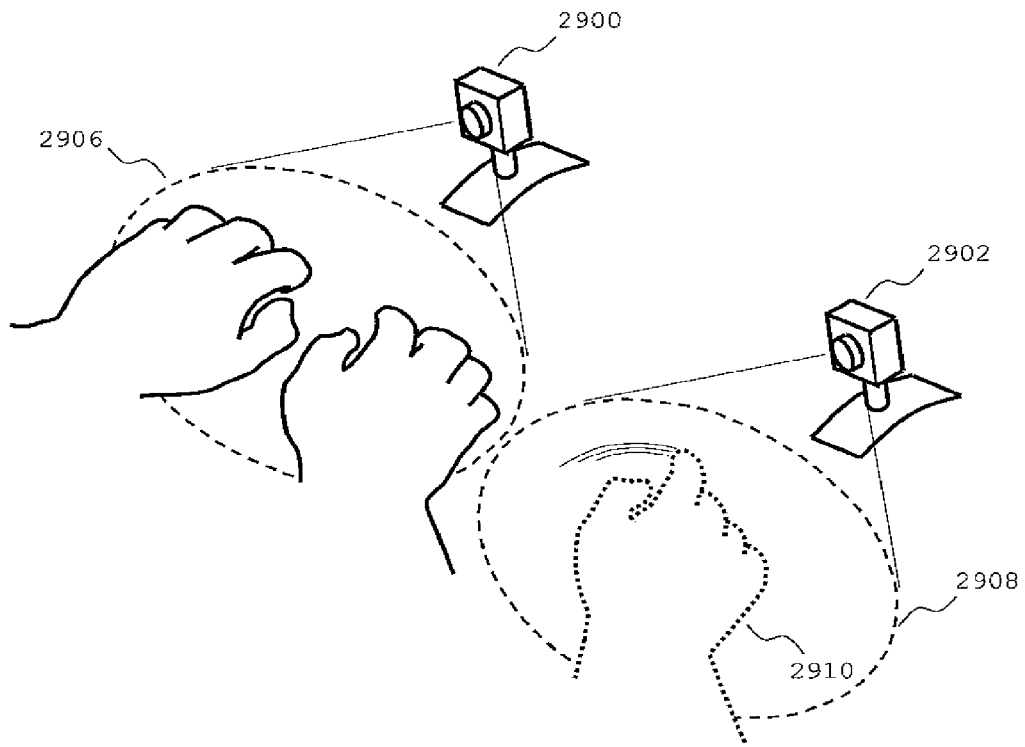
FIG. 29 illustrates an exemplary embodiment of the present invention wherein two video capturing devices are provided to separately acquire virtual keyboard input and virtual multi-touch input.

As the keyboard and the touchpad are the two most commonly used virtual interface, users will appreciate convenient, automated methods for switching between the two modes of input. Illustrated in FIG. 29 is one embodiment wherein two video capturing devices 2900 and 2902 are provided to remotely acquire information from the input regions 2906 and 2908, respectively, as well as actuating object information, such as those caused by a user's fingers 2904. A QWERTY style keyboard is provided in input region 2906 and a multi-touch capable touchpad is provided in input region 2908. During operation, active input may be automatically switched from the keyboard input region 2906 over to the touchpad input region 2902 as soon as the touchpad device detects the presence of a user's hand 2910 within its input region 2908. Input may be automatically switched or defaulted back to the keyboard input region 2906 once the user removes his hand 2910 from the designated input area 2908 of the touchpad device.

Figure 30:
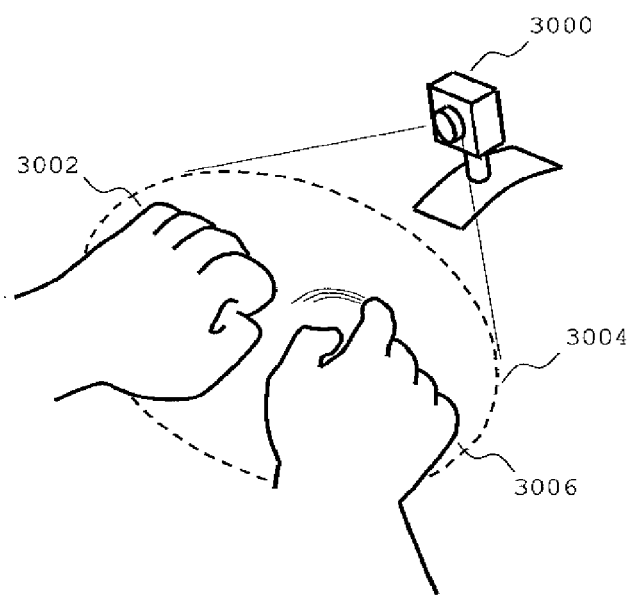
FIG. 30 illustrates an exemplary embodiment of the present invention wherein a single video capturing device is provided to acquire both virtual keyboard input and virtual multi-touch input.

Illustrated in FIG. 30 is a second embodiment wherein a single video capturing device 3000 is provided to remotely acquire information from the input region 3004. A virtual QWERTY style keyboard and a multi-touch capable touchpad are provided in input region 3004. In this configuration, users may conveniently switch from keyboard to touchpad input by, for example, removing one hand 3002 from the input region 3004. Input may be automatically switched or defaulted back to the keyboard once the user places his hand 3002 within the input region 3004 again. Alternatively, instead of removing one hand 3002 from the input region 3004, the user can make some gesture with that hand, such as folding the hand into a fist as shown in FIG. 30, to signal a switch from keyboard to mouse input.

In a further exemplary embodiment, instantaneous switching between input modes may be achieved by assigning specific gestures to individual input modes in the same input region. For example, input objects such as a user's right index finger and middle finger, when posed in a "V" sign as that shown in FIG. 15 may be used to signal instantaneous touchpad input while a virtual device is operating as a keyboard. This way, the need to first switch into touchpad mode and out of touchpad mode is eliminated. It is thus apparent from the embodiments described above that automated switching of input between a virtual keyboard and virtual touchpad device may be achieved by detecting the presence/absence and/or the state (e.g., posture) of the input objects.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

I claim:

1. A virtual touchpad for determining virtual data input comprising:
   a virtual input region;
   a memory unit for storing information associating functions with unique input objects, the functions comprising at least one of a left mouse click, a right mouse click, a cursor movement, a move-to-next menu item, a render a trace, a drag and drop, a hold, a scroll, a change page;
   an input module for remotely acquiring data from the input region and using a processor to determine from the acquired data an actuation of the virtual input region, the location of the actuation and the unique input object responsible for the actuation; and
   perform the function associated with the unique input object responsible for the actuation.

2. The virtual touchpad of claim 1 wherein the unique input objects are the fingers of a user's hands.

3. The virtual touchpad of claim 2 wherein one finger of the user's hand is associated with a left click and a different finger of the user's hand is associated with a right click.

4. The virtual touchpad of claim 1 comprising determining an actuation at a first location in the virtual input region and a sliding motion to a second location in the input region and determining the input object responsible for the sliding motion and performing the function associated with the input object.

5. The virtual touchpad of claim 4 wherein the function is a cursor movement or a rendering of a trace.

6. The virtual touchpad of claim 1 wherein a right index finger is associated with a left mouse click.

7. The virtual touchpad of claim 6 wherein a right middle finger is associated with a right mouse click.

8. The virtual touchpad of claim 1 wherein the right index finger is associated with a next function in the selection of an item from a group of items in a menu.

9. The virtual touchpad of claim 2 wherein multiple fingers are associated with a function.

10. A cellular telephone for determining virtual data input, comprising:
 an input region having a plurality of key regions accessible by a user of the cellular telephone for inputting symbols or initiating functions by the cellular telephone;
 a memory unit for storing information associating individual input symbols or functions with key regions, and associations of symbols or functions with unique input objects from a group of unique input objects where each unique input object has a defining feature that differentiates it from other unique input objects of the group;
 an input module adapted to remotely acquire data from the input region;
 a processor adapted to:
 determine from the acquired data an actuation of one of the key regions caused by one of the unique input objects;
 identify from the acquired data the identity of the unique input object responsible for the actuation;
 determine for the actuated key region an input symbol or function in response to the identification of the unique input object responsible for the actuation; and
 output the input symbol or perform the function.

11. The cellular telephone of claim 10 wherein the input region is a retractable panel.

12. The cellular telephone of claim 10 wherein the location of the input region is set dynamically and in a fixed relation to a reference object.

13. The cellular telephone of claim 12 wherein the reference object comprises one of: (a) a user's face; (b) knuckle(s) of a finger; (c) a user's shoulders; and (d) a user's chest.

14. The cellular telephone of claim 10 wherein the group of unique input objects comprises the fingers of a user's hands.

15. The cellular telephone of claim 10 wherein the input module comprises a single video capturing device.

16. The cellular telephone of claim 15 wherein the input module comprises two video capturing devices, one of the video capturing devices for determining that an actuation of the input region has occurred and the other video capturing device for identifying the input object responsible for actuation of the input region.

17. The cellular telephone of claim 10 wherein the identifying feature is selected from the group consisting of: (a) size; (b) shape; (c) edge; (d) vein pattern; (e) nail color; (f) skin texture; (g) skin tone, and combinations of the same.

18. The cellular telephone of claim 10 wherein the processor is adapted to determine the relative location of the actuation in relation to a reference object.

19. The cellular telephone of claim 18 wherein the reference object comprises one of: (a) a user's face; (b) knuckle(s) of a finger; (c) a user's shoulders; and (d) a user's chest.

20. The cellular telephone of claim 18 wherein the reference object comprises one of: (a) a user's hand; and (b) a palm.

* * * * *